United States Patent
Oishi

(10) Patent No.: US 10,432,083 B2
(45) Date of Patent: Oct. 1, 2019

(54) PROTECTION CONTROL APPARATUS FOR POWER CONVERSION CIRCUITRY AND CONTROL METHOD THEREOF

(71) Applicant: Toyota Jidosha Kabushiki Kaisha, Toyota-shi, Aichi-ken (JP)

(72) Inventor: Makoto Oishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/233,270

(22) Filed: Dec. 27, 2018

(65) Prior Publication Data
US 2019/0207509 A1   Jul. 4, 2019

(30) Foreign Application Priority Data
Dec. 29, 2017 (JP) ................. 2017-255130

(51) Int. Cl.
| | | |
|---|---|---|
| *H02M 1/32* | (2007.01) | |
| *H02M 1/36* | (2007.01) | |
| *H02M 1/00* | (2006.01) | |
| *H02M 3/335* | (2006.01) | |

(52) U.S. Cl.
CPC ............. *H02M 1/32* (2013.01); *H02M 1/36* (2013.01); *H02M 3/33515* (2013.01); *H02M 2001/0003* (2013.01)

(58) Field of Classification Search
CPC .. H02M 1/32; H02M 1/36; H02M 2001/0003; H02M 3/33515
See application file for complete search history.

(56) References Cited

U.S. PATENT DOCUMENTS

| | | | |
|---|---|---|---|
| 9,321,369 B2* | 4/2016 | Onishi | ............... B60L 15/007 |
| 9,431,914 B2* | 8/2016 | Freeman | ............... H02M 1/08 |
| 2007/0055902 A1 | 3/2007 | Bousfield et al. | |
| 2008/0010541 A1 | 1/2008 | Kudo | |
| 2008/0238488 A1* | 10/2008 | Comisky | ............... G01R 31/40 327/20 |

(Continued)

FOREIGN PATENT DOCUMENTS

| | | |
|---|---|---|
| JP | 2007-310714 A | 11/2007 |
| JP | 2009-201195 A | 9/2009 |

(Continued)

*Primary Examiner* — Kyle J Moody
(74) *Attorney, Agent, or Firm* — Dinsmore & Shohl LLP

(57) ABSTRACT

A protection control apparatus includes a computer, communication controller, and shutdown circuitry. The computer monitors fail signals delivered from the power conversion circuitry to a first number of first signal lines, and creates reject information indicating whether each fail signal is enabled or rejected. The communication controller receives the reject information from the computer via a second number, which is smaller than the first number, of communication lines, and delivers reject signals to the first number of second signal lines, based on the reject information. The shutdown circuitry is provided on the same chip or module as the communication controller, and permits driving of the power conversion circuitry or shut down the power conversion circuitry, based on the fail signals from the first number of first signal lines, and the reject signals from the first number of second signal lines.

20 Claims, 29 Drawing Sheets

(56) References Cited

U.S. PATENT DOCUMENTS

| | | | |
|---|---|---|---|
| 2013/0151919 A1* | 6/2013 | Huynh | G06F 1/26 |
| | | | 714/746 |
| 2016/0365822 A1 | 12/2016 | Tanabe | |
| 2017/0019015 A1* | 1/2017 | Wibben | H02M 1/36 |
| 2017/0254325 A1 | 9/2017 | Tajima et al. | |

FOREIGN PATENT DOCUMENTS

| | | |
|---|---|---|
| JP | 2016-207002 A | 12/2016 |
| JP | 2017-135897 A | 8/2017 |

* cited by examiner

FIG. 4

| DATA DIRECTION | PACKET | START BIT bit0 | COMMAND bit1 | DATA bit2 | bit3 | bit4 | bit5 | bit6 | bit7 | bit8 | bit9 | bit10 | bit11 | bit12 | bit13 | bit14 |
|---|---|---|---|---|---|---|---|---|---|---|---|---|---|---|---|---|
| MICRO-COMPUTER → COMMUNI-CATION CONTROLLER | FIRST TRANS-MISSION PACKET | 1 | 0 | RGi[1] | RGi[2] | RGi[3] | RGi[4] | RGi[5] | RGi[6] | RGi[7] | RGi[8] | RGi[9] | RGi[10] | RGi[11] | RGi[12] | PARITY BIT |
| COMMUNI-CATION CONTROLLER → MICRO-COMPUTER | FIRST REPLY PACKET | 1 | 0 | RGi[1] | RGi[2] | RGi[3] | RGi[4] | RGi[5] | RGi[6] | RGi[7] | RGi[8] | RGi[9] | RGi[10] | RGi[11] | RGi[12] | LAST COMMAND EXECUTION RESULT |

FIG. 5

| BIT POSITION | FIRST TRANSMISSION PACKET | FIRST REPLY PACKET |
|---|---|---|
| bit0 | START BIT: 1 (NOTIFYING PACKET START) | START BIT: 1 (NOTIFYING PACKET START) |
| bit1 | COMMAND BIT: 0 (MEANING RG SETTING TRANSMISSION COMMAND) | RECEIVED VALUE BIT |
| bit2~13 | RGi:0/1 (FAIL SIGNAL ENABLED / FAIL SIGNAL REJECTED) | RECEIVED VALUE BIT |
| bit14 | PARITY BIT | LAST COMMAND EXECUTION RESULT BIT 1/0 (SUCCEEDED/FAILED) |

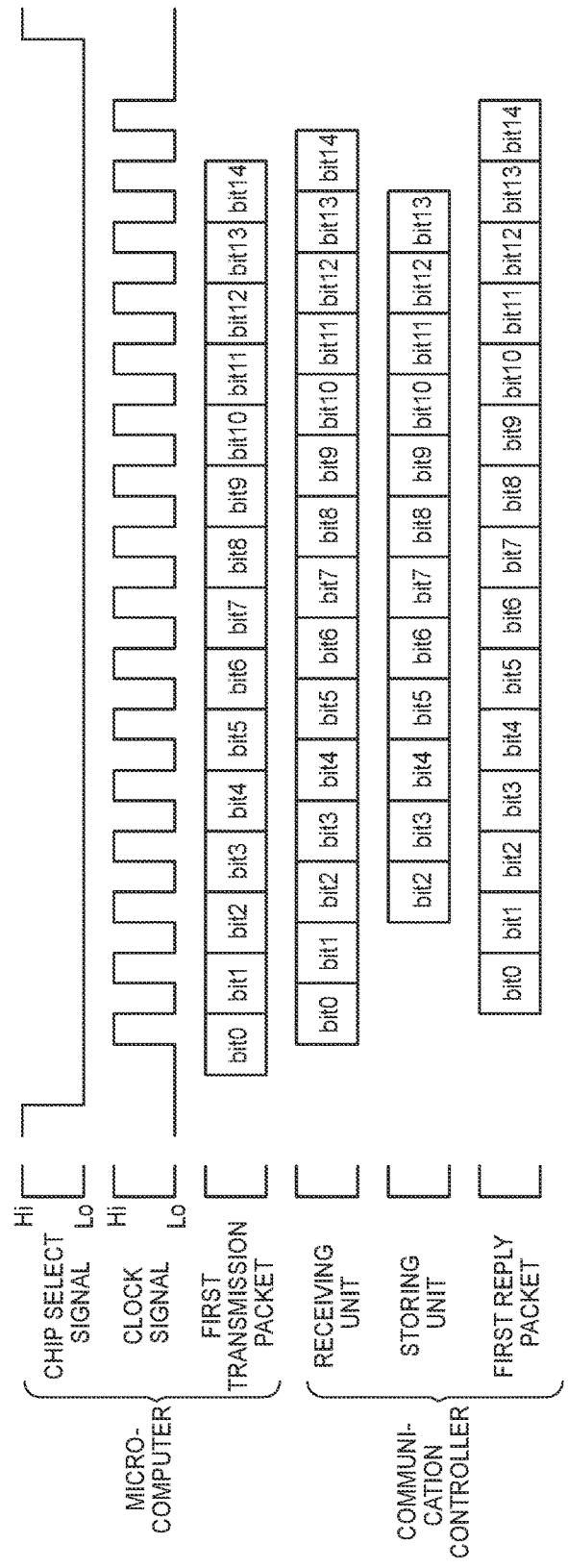

FIG. 7

| TYPE | METHOD |
| --- | --- |
| PACKET INTERVAL MONITORING | - MONITOR COMMUNICATION INTERVAL (CS=Lo INTERVAL)<br>- ABNORMALITY DETERMINATION: Lo INTERVAL IS PREDETERMINED TIME |
| PACKET PARITY MONITORING | - MONITOR PARITY BIT FOR EACH PACKET<br>- BITS UNDER PARITY CHECK: bit0 – bit13<br>- ABNORMALITY DETERMINATION: PARITY NG |
| PACKET HEADER MONITORING | - MONITOR START BIT, COMMAND BIT FOR EACH PACKET<br>- ABNORMALITY DETERMINATION: NON-SPECIFIED COMBINATION |
| PACKET CLOCK NUMBER MONITORING | - MONITOR CLOCK NUMBER FOR EACH PACKET<br>- ABNORMALITY DETERMINATION: OTHER THAN 16 CLOCKS |
| PACKET DATA MONITORING | - MONITOR DATA BITS FOR EACH PACKET<br>- ABNORMALITY DETERMINATION:<br>  <RG SETTING TRANSMISSION COMMAND> IGNORED<br>  <RG SETTING REFLECTION COMMAND><br>    bit2 – bit13 OTHER THAN ALL 0 |

FIG. 8

| BIT POSITION IN FIRST REPLY PACKET | NORMALITY CRITERIA OF FIRST REPLY PACKET |
| --- | --- |
| bit0 | 1 |
| bit1 | 0 |
| bit2~13 | MATCHING TRANSMITTED VALUES |
| bit14 | 1 |

FIG. 9

| DATA DIRECTION | PACKET | START BIT bit0 | COMMAND bit1 | DATA bit2 | bit3 | bit4 | bit5 | bit6 | bit7 | bit8 | bit9 | bit10 | bit11 | bit12 | bit13 | bit14 |
|---|---|---|---|---|---|---|---|---|---|---|---|---|---|---|---|---|
| MICRO-COMPUTER → COMMUNI-CATION CONTROLLER | SECOND TRANS-MISSION PACKET | 1 | 1 | 0 | 0 | 0 | 0 | 0 | 0 | 0 | 0 | 0 | 0 | 0 | 0 | PARITY BIT |
| COMMUNI-CATION CONTROLLER → MICRO-COMPUTER | SECOND REPLY PACKET | 1 | 1 | RGii[1] RE-FLECT-ION RE-SULT | RGii[2] RE-FLECT-ION RE-SULT | RGii[3] RE-FLECT-ION RE-SULT | RGii[4] RE-FLECT-ION RE-SULT | RGii[5] RE-FLECT-ION RE-SULT | RGii[6] RE-FLECT-ION RE-SULT | RGii[7] RE-FLECT-ION RE-SULT | RGii[8] RE-FLECT-ION RE-SULT | RGii[9] RE-FLECT-ION RE-SULT | RGii[10] RE-FLECT-ION RE-SULT | RGii[11] RE-FLECT-ION RE-SULT | RGii[12] RE-FLECT-ION RE-SULT | LAST COMMAND EXECUTION RESULT |

FIG. 10

| BIT POSITION | SECOND TRANSMISSION PACKET | SECOND REPLY PACKET |
|---|---|---|
| bit0 | START BIT: 1 (NOTIFYING PACKET START) | START BIT: 1 (NOTIFYING PACKET START) |
| bit1 | COMMAND BIT: 1 (MEANING RG SETTING REFLECTION COMMAND) | RECEIVED VALUE |
| bit2~13 | COMMAND BIT: ALL 0 (MEANING SETTING REFLECTION COMMAND) | RG REFLECTION RESULT: 0/1 (FAIL SIGNAL ENABLED / FAIL SIGNAL REJECTED) |
| bit14 | PARITY BIT | LAST COMMAND EXECUTION RESULT BIT 1/0 (SUCCEEDED/FAILED) |

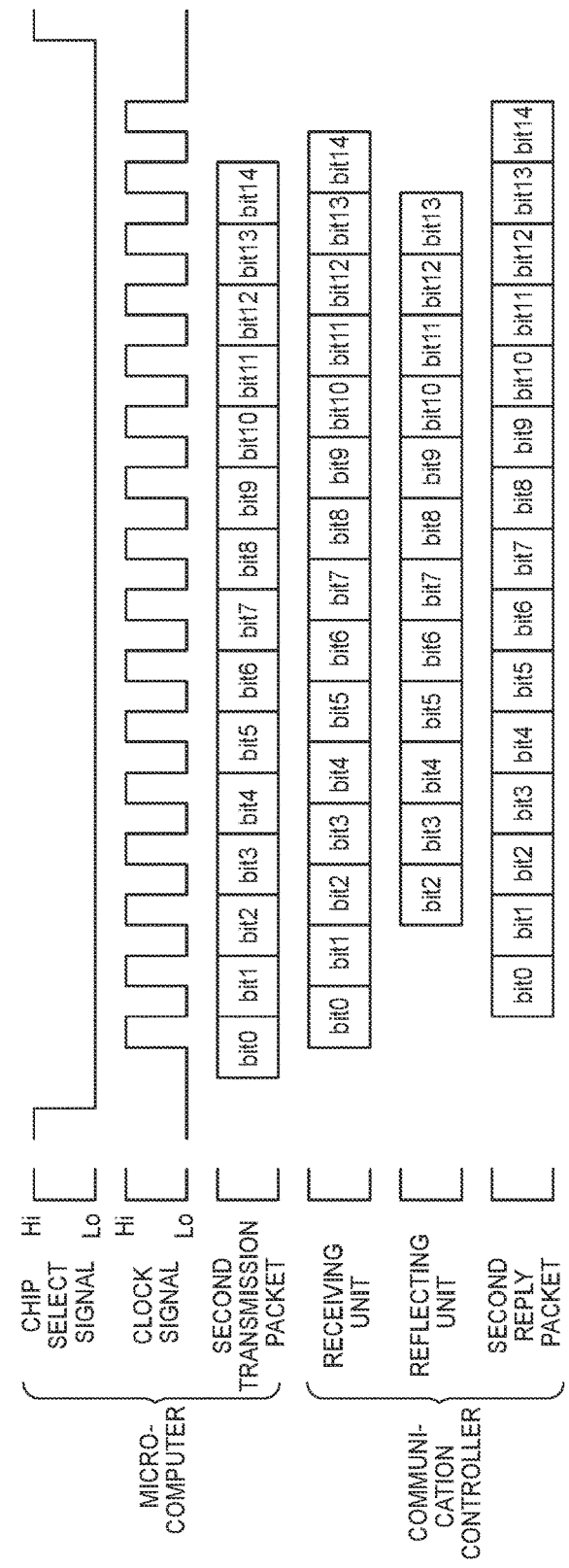

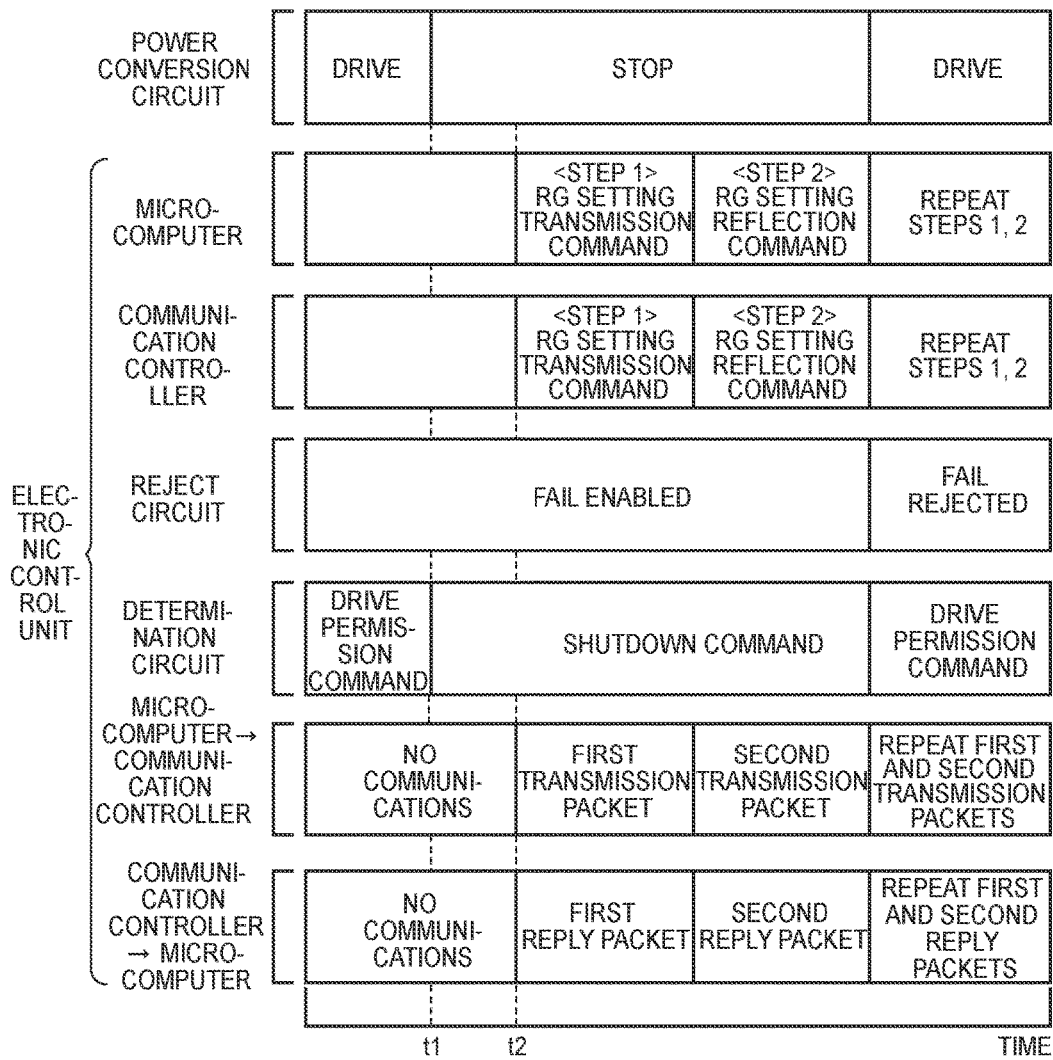

FIG. 15

| DATA DIRECTION | PACKET | START BIT bit0 | COMMAND bit1 | DATA bit2 | bit3 | bit4 | bit5 | bit6 | bit7 | bit8 | bit9 | bit10 | bit11 | bit12 | bit13 | bit14 |
|---|---|---|---|---|---|---|---|---|---|---|---|---|---|---|---|---|
| MICRO-COMPUTER → COMMUNICATION CONTROLLER | THIRD TRANSMISSION PACKET | 1 | 0 | RG[1] | RG[2] | RG[3] | RG[4] | RG[5] | RG[6] | RG[7] | RG[8] | RG[9] | RG[10] | RG[11] | RG[12] | PARITY BIT |
| COMMUNICATION CONTROLLER → MICRO-COMPUTER | THIRD REPLY PACKET | 1 | 1 | RG[1] REFLECTION RESULT | RG[2] REFLECTION RESULT | RG[3] REFLECTION RESULT | RG[4] REFLECTION RESULT | RG[5] REFLECTION RESULT | RG[6] REFLECTION RESULT | RG[7] REFLECTION RESULT | RG[8] REFLECTION RESULT | RG[9] REFLECTION RESULT | RG[10] REFLECTION RESULT | RG[11] REFLECTION RESULT | RG[12] REFLECTION RESULT | LAST COMMAND EXECUTION RESULT |

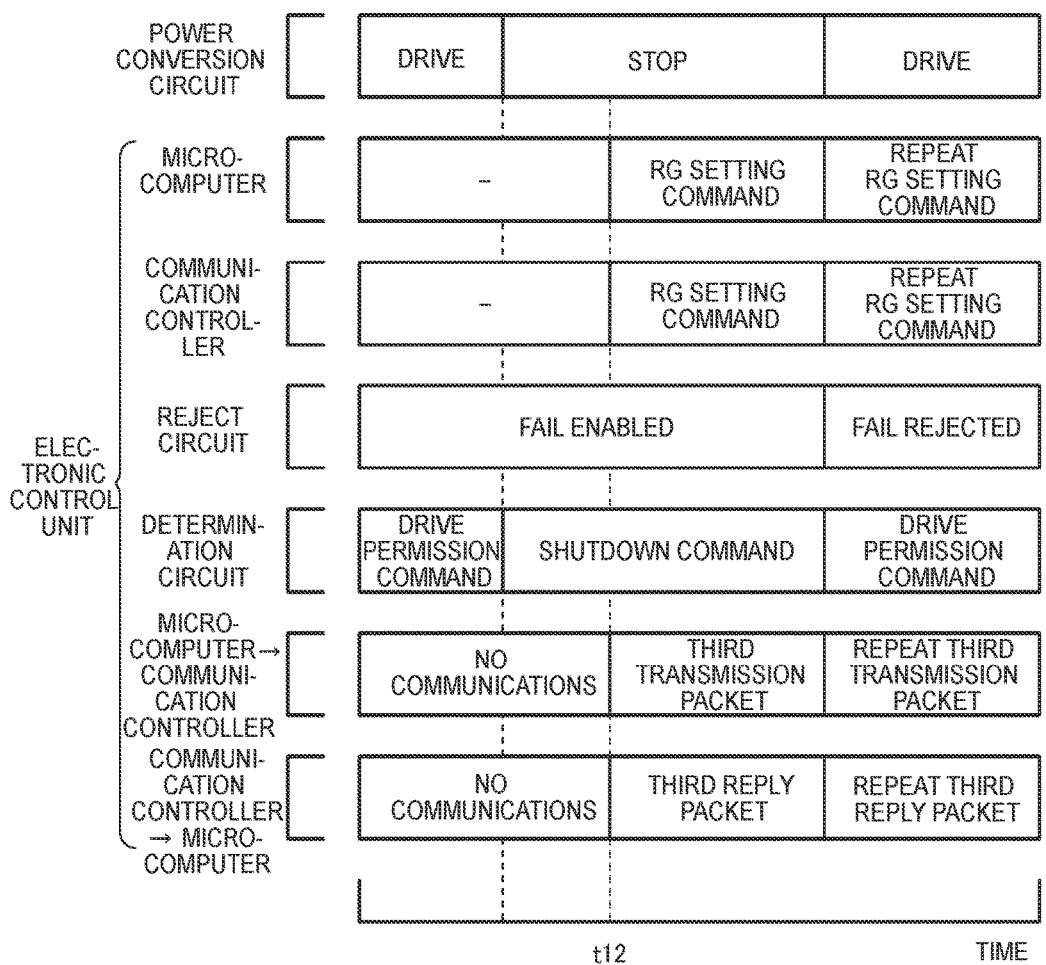

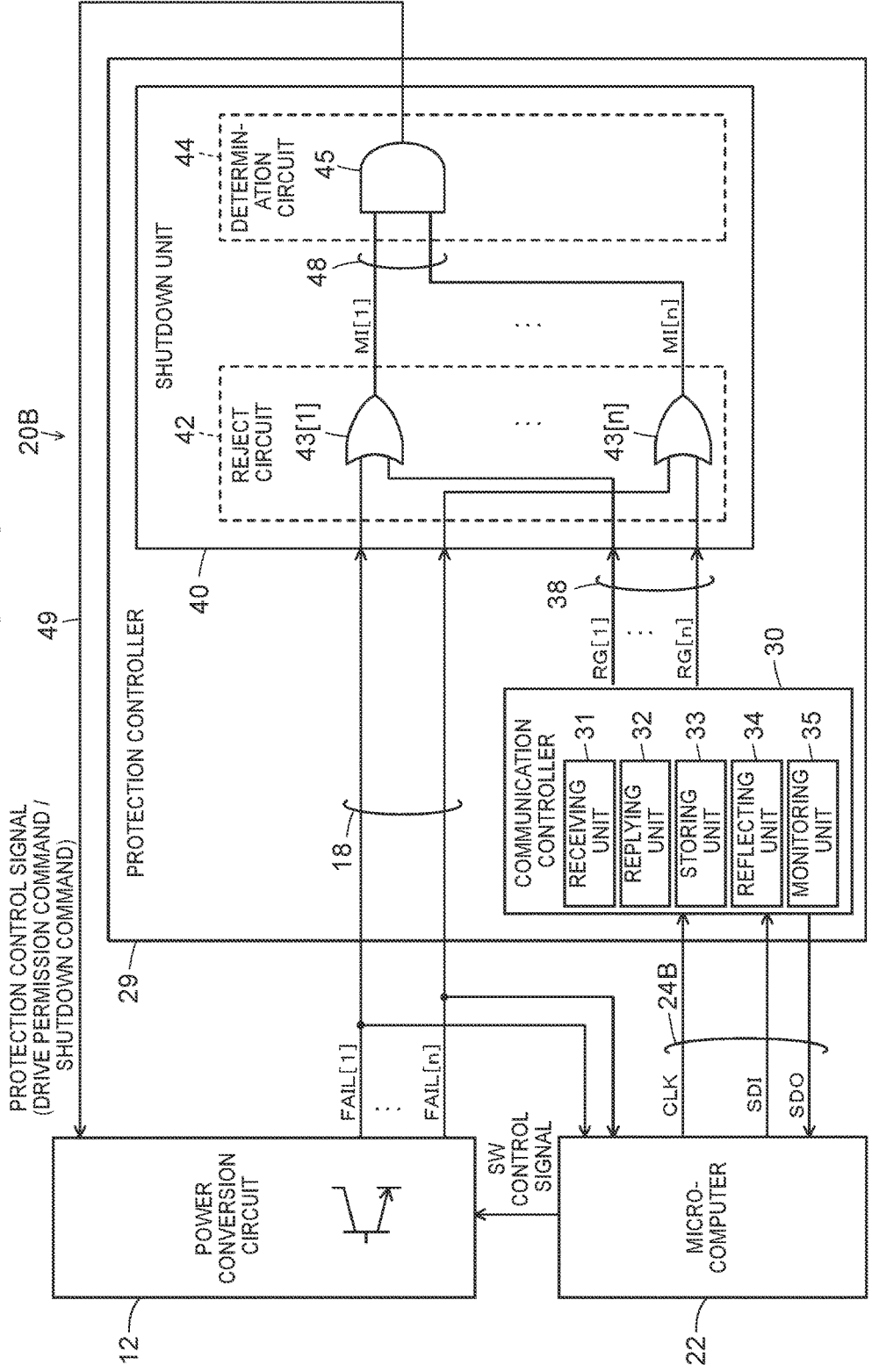

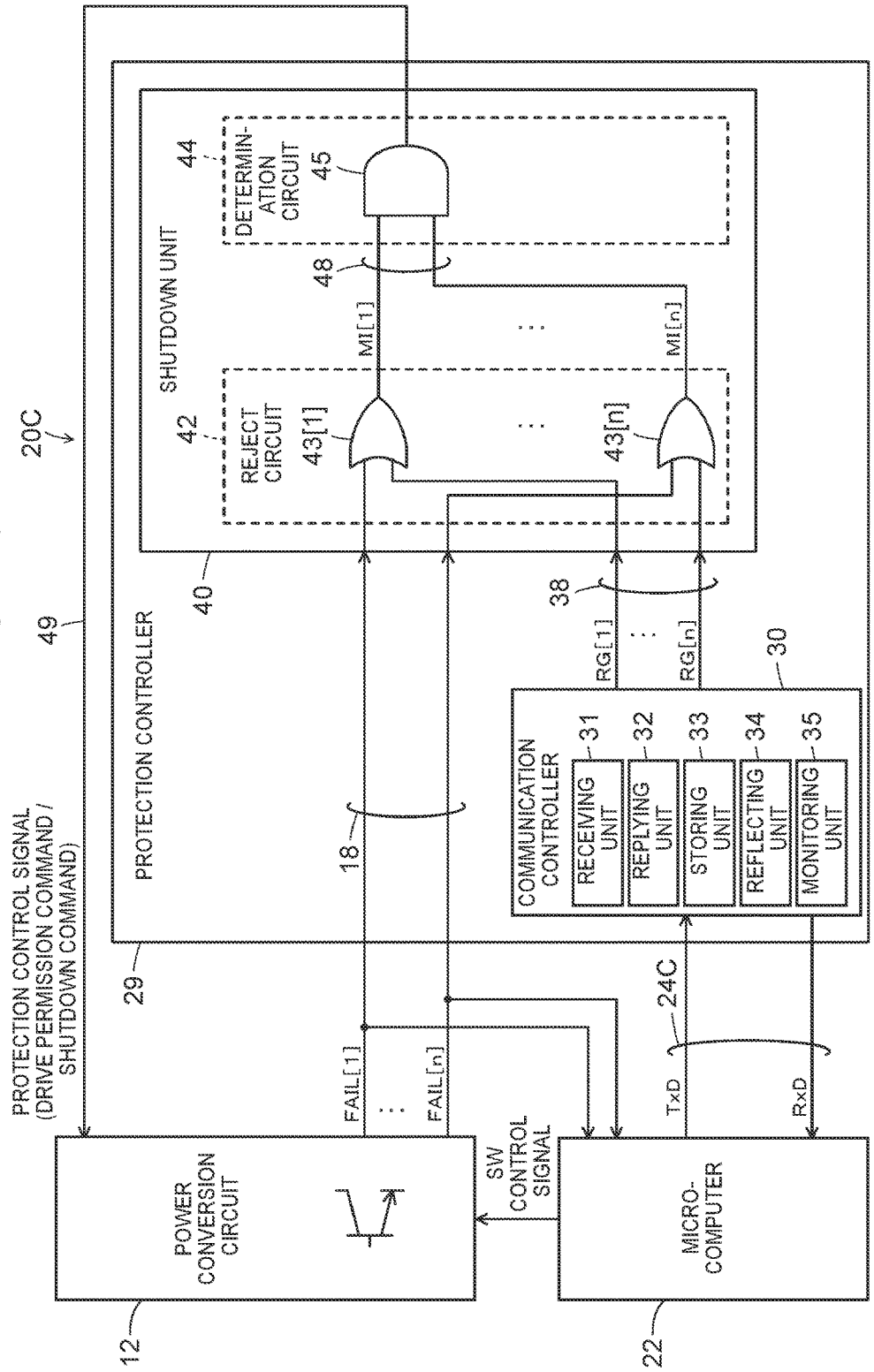

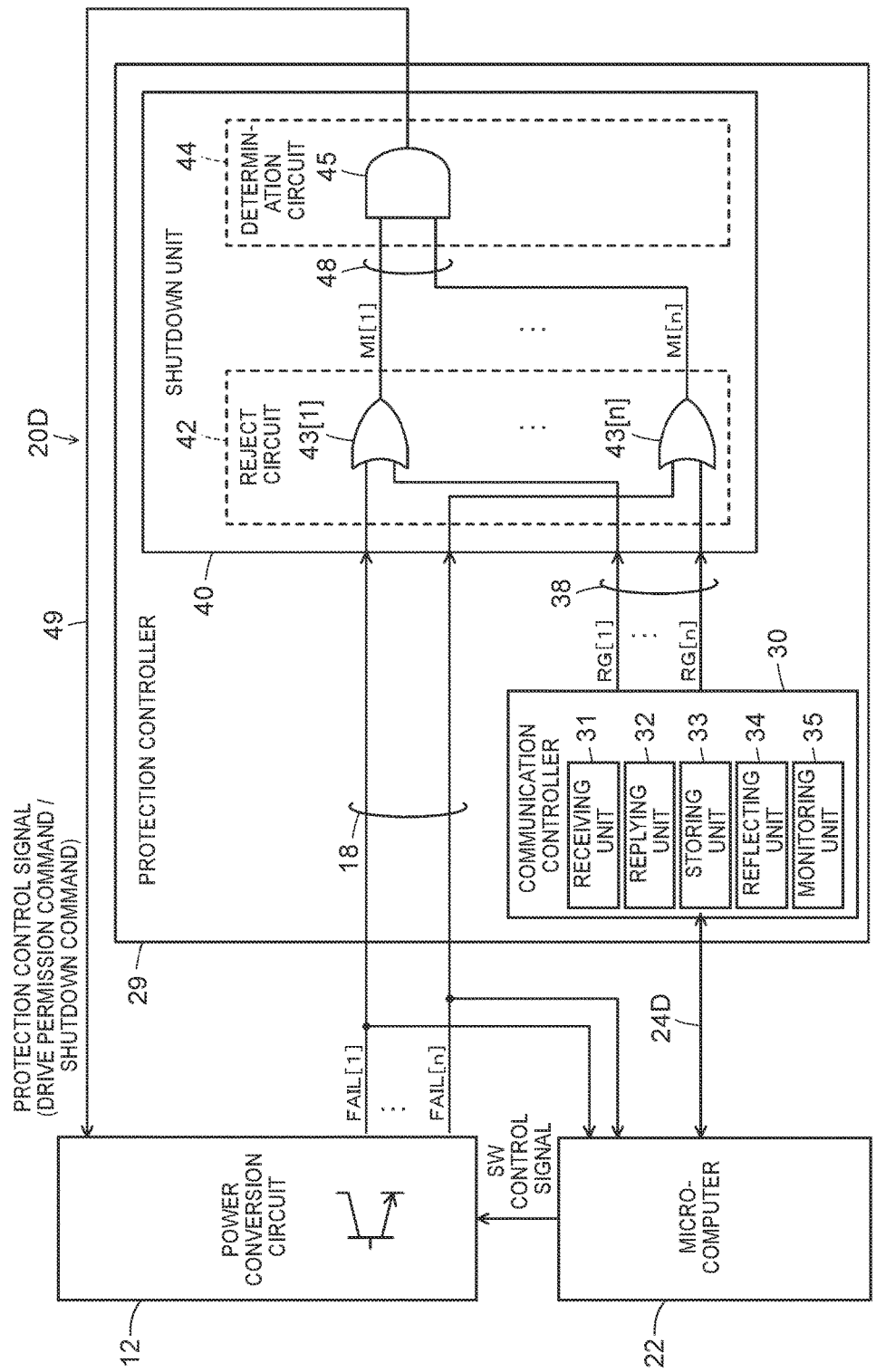

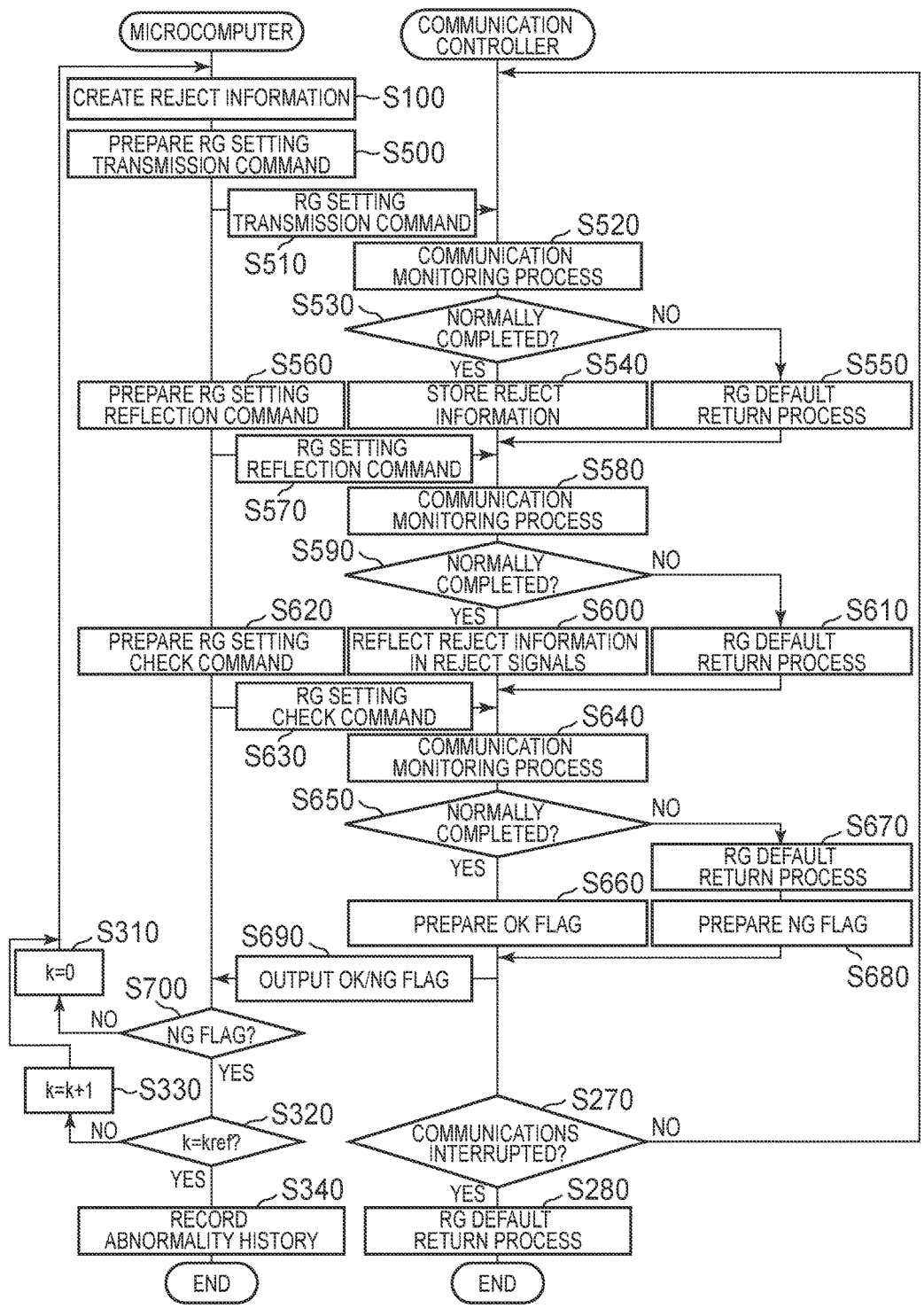

FIG. 23

| COMMAND | PACKET | START BIT bit0 | COMM-AND bit1 | DATA bit2 | bit3 | bit4 | bit5 | bit6 | bit7 | bit8 | bit9 | bit10 | bit11 | bit12 | bit13 | bit14 |
|---|---|---|---|---|---|---|---|---|---|---|---|---|---|---|---|---|
| RG SETTING TRANSMISSION COMMAND | FOURTH PACKET | 1 | 0 | RGi[1] | RGi[2] | RGi[3] | RGi[4] | RGi[5] | RGi[6] | RGi[7] | RGi[8] | RGi[9] | RGi[10] | RGi[11] | RGi[12] | PARITY BIT |
| RG SETTING REFLECTION COMMAND | FIFTH PACKET | 1 | 1 | 0 | 0 | 0 | 0 | 0 | 0 | 0 | 0 | 0 | 0 | 0 | 0 | PARITY BIT |
| RG SETTING CHECK COMMAND | SIXTH PACKET | 0 | 0 | RGi[1] REVERSAL VALUE | RGi[2] REVERSAL VALUE | RGi[3] REVERSAL VALUE | RGi[4] REVERSAL VALUE | RGi[5] REVERSAL VALUE | RGi[6] REVERSAL VALUE | RGi[7] REVERSAL VALUE | RGi[8] REVERSAL VALUE | RGi[9] REVERSAL VALUE | RGi[10] REVERSAL VALUE | RGi[11] REVERSAL VALUE | RGi[12] REVERSAL VALUE | PARITY BIT |

FIG. 24

| TYPE | METHOD |
|---|---|
| PACKET INTERVAL MONITORING | - MONITOR COMMUNICATION INTERVAL (CS=Lo INTERVAL)<br>- ABNORMALITY DETERMINATION: Lo INTERVAL IS PREDETERMINED TIME |
| PACKET PARITY MONITORING | - MONITOR PARITY BIT FOR EACH PACKET<br>- BITS UNDER PARITY CHECK: bit0 – bit13<br>- ABNORMALITY DETERMINATION: PARITY NOT MATCHING |
| PACKET HEADER MONITORING | - MONITOR START BIT, COMMAND BIT FOR EACH PACKET<br>- ABNORMALITY DETERMINATION:<br>  NON-SPECIFIED COMBINATION |
| PACKET CLOCK NUMBER MONITORING | - MONITOR CLOCK NUMBER FOR EACH PACKET<br>- ABNORMALITY DETERMINATION: OTHER THAN 16 CLOCKS |
| PACKET DATA MONITORING | - MONITOR DATA BITS FOR EACH PACKET<br>- ABNORMALITY DETERMINATION:<br>  <RG SETTING TRANSMISSION COMMAND> IGNORED<br>  <RG SETTING REFLECTION COMMAND> bit2 – bit13 OTHER THAN ALL 0<br>  <RG SETTING CHECK COMMAND> AT LEAST ONE PAIR<br>  OF STORED VALUES AND LATCHED VALUES OF bit2 – bit13 MATCHING |

FIG. 25

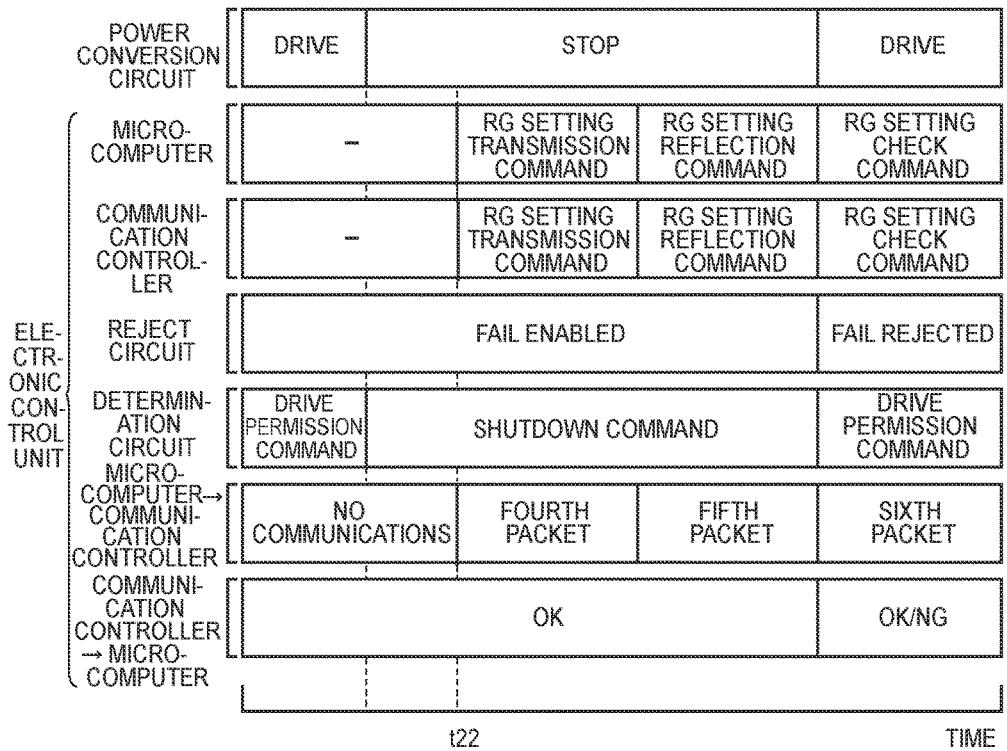

PROTECTION CONTROL APPARATUS FOR POWER CONVERSION CIRCUITRY AND CONTROL METHOD THEREOF

CROSS-REFERENCE TO RELATED APPLICATIONS

This application claims priority to Japanese Patent Application No. 2017-255130 filed on Dec. 29, 2017, which is incorporated herein by reference in its entirety including the specification, drawings and abstract.

BACKGROUND

1. Technical Field

The disclosure relates to a protection control apparatus for power conversion circuitry and a control method of a protection control apparatus for the power conversion circuitry.

2. Description of Related Art

One example of the protection control apparatus for the power conversion circuitry has been proposed which includes a computing unit (central processing unit (CPU)) and a logic circuit (see, for example, Japanese Patent Application Publication No. 2009-201195 (JP 2009-201195 A)). The computing unit (CPU) generates a shutdown command signal for the power conversion circuitry, based on an overvoltage signal from an overvoltage detection circuit that detects the excess voltage in power supply wiring of the power conversion circuitry (converter), and outputs the shutdown command signal to the power conversion circuitry via a first signal line. The logic circuit generates a shutdown command signal for the power conversion circuitry, and outputs it to the power conversion circuitry via a second signal line, when an overvoltage signal is generated, based on an output signal (a shutdown command signal or reject signal of the power conversion circuitry) from the computing unit, and an output signal from the overvoltage detection circuit. In this apparatus, even when an abnormality, such as disconnection, occurs to either one of the first signal line and the second signal line, it is possible to transmit the shutdown command signal to the power conversion circuitry.

SUMMARY

In the protection control apparatus for the power conversion circuitry as described above, as the types of shutdown command signals and reject signals of the power conversion circuitry increase, the number of signal lines that connect the computing unit with the power conversion circuitry, and the number of signal lines that connect the computing unit with the logic circuit, are increased, resulting in increase of the failure rate.

The present disclosure provides a protection control apparatus for power conversion circuitry, which curbs increase of the failure rate when the types of shutdown command signals and reject signals of the power conversion circuitry and a control method of a protection control apparatus for the power conversion circuitry are increased.

A protection control apparatus for power conversion circuitry according to first aspect of the disclosure includes a computer, a communication controller, and shutdown circuitry. The computer is configured to monitor a plurality of fail signals delivered from the power conversion circuitry to a first number of first signal lines, and create reject information indicating whether each of the fail signals is enabled or rejected. The communication controller is configured to receive the reject information on each of the fail signals from the computer via a second number of communication lines, and deliver a plurality of reject signals to the first number of second signal lines, based on the reject information. The second number is smaller than the first number. The shutdown circuitry is provided on the same chip or the same module as the communication controller, and is configured to permit driving of the power conversion circuitry or shut down the power conversion circuitry, based on the fail signals received from the first number of the first signal lines, and the reject signals received from the first number of the second signal lines.

With the above configuration, the number (second number) of the communication lines can be made relatively small, and the number of the communication lines is less likely or unlikely to be increased when the number (first number) of the first or second signal lines is increased; therefore, the failure rate is less likely or unlikely to be increased. Also, since the number of the first signal lines is equal to that of the second signal lines, two or more fail signals (all fail signals when there is only one second signal line) are prevented from being rejected when an abnormality occurs to any one of the second signal lines, unlike the case where the number of the second signal lines is smaller than the number of the first signal lines (e.g., when there is only one second signal line).

In the protection control apparatus according to the above aspect of the disclosure, communications between the computer and the communication controller may be conducted for each set of a predetermined number of bits corresponding to the first number. Thus, the communications can be conducted for each set of the predetermined number of bits corresponding to the first number (the number of types of failure signals).

In the protection control apparatus according to the above aspect of the disclosure, the second number may be determined as a constant value, irrespective of the first number. Thus, the number (second number) of the communication lines can be made less likely or unlikely to be increased when the number (first number) of the first or second signal lines is increased. In this case, the second number may be set to value 4 or smaller.

In the protection control apparatus according to the above aspect of the disclosure, the computer may be configured to send a first bit array having bits each including the reject information, to the communication controller, and then send a second bit array to the communication controller. The communication controller may be configured to store the reject information of each of the bits included in the first bit array, when receiving the first bit array, and is configured to reflect the stored reject information of each of the bits, in a corresponding one of the reject signals, when receiving the second bit array. Thus, through transmission (two-step transmission) of the first and second bit arrays, the reject information of each bit can be reflected by a corresponding one of the reject signals. In this case, the second bit array may not include the reject information of each of the bits.

In this case, upon receipt of the first bit array, the communication controller may be configured to send back a reply bit array having bits each including the reject information, to the computer, and, upon receipt of the reply bit array, the computer may be configured to compare the reject information of each of the bits included in the first bit array, with the reject information of each of the bits included in the reply bit array, and send the second bit array to the communication controller when the reject information in the first bit array coincides with the reject information in the reply bit array. Also, upon receipt of the second bit array, the communication controller may be configured to reflect the reject information of each of the bits, in the corresponding one of the reject signals, and send back a reflection bit array having bits each including a reflection result on each of the reject signals, to the computer, and, upon receipt of the reflection bit array, the computer may be configured to compare the reject information of each of the bits included in the first bit array, with the reflection result included in the reflection bit array. Further, the computer may be configured to send a third bit array having bits each including reject-related information related to the reject information of each of the bits, to the communication controller, after sending the second bit array to the communication controller, and, upon receipt of the third bit array, the communication controller may be configured to compare the reject information of each of the bits included in the first bit array, with the reject-related information of a corresponding one of the bits included in the third bit array, and deliver a comparison result to the computer via a third signal line. In addition, the computer may be configured to send a third bit array having bits each including reject-related information related to the reject information of each of the bits, to the communication controller, after sending the second bit array to the communication controller, and, upon receipt of the third bit array, the communication controller may be configured to compare the reject information of each of the bits included in the first bit array or the reject-related information of each of the bits included in the third bit array, with a result of reflection of the reject information in the corresponding one of the reject signals, and deliver a comparison result to the computer via a third signal line. Also, the computer may be configured to monitor a first command signal to permit driving of the power conversion circuitry, or a second command signal to shut down the power conversion circuitry, which is transmitted from the shutdown circuitry to the power conversion circuitry. Further, upon receipt of a given bit array, the communication controller may be configured to determine whether the given bit array has been normally received. With these configurations, it can be determined whether communications between the computer and the communication controller were normally conducted, and the reliability in communications between the computer and the communication controller can be improved. In these cases, the computer may be configured to store a result of detection of an abnormality in communications between the computer and the communication controller when the abnormality is detected. In this manner, the operator can be made aware of the abnormality history during maintenance.

In the protection control apparatus according to the above aspect of the disclosure, the computer may be configured to send a bit array having bits each including the reject information, to the communication controller, and, upon receipt of the bit array, the communication controller may be configured to reflect the reject information of each of the bits included in the bit array, in a corresponding one of the reject signals. With this configuration, the reject information of each bit can be easily reflected by the corresponding reject signal.

In this case, upon receipt of the bit array, the communication controller may be configured to reflect the reject information of each of the bits, in the corresponding one of the reject signals, and send back a reflection bit array having bits each including a reflection result on each of the reject signals, to the computer, and, upon receipt of the reflection bit array, the computer may be configured to compare the reject information of each of the bits included in the bit array, with the reflection result included in the reflection bit array. Also, the communication controller may be configured to deliver information as to whether the reject information of each of the bits is reflected by the corresponding one of the reject signals, to the computer, via a third signal line. Further, the computer may be configured to monitor a first command signal to permit driving of the power conversion circuitry, or a second command signal to shut down the power conversion circuitry. The first command signal and the second command signal are transmitted from the shutdown circuitry to the power conversion circuitry. In addition, upon receipt of a given bit array, the communication controller may be configured to determine whether the given bit array has been normally received. With these configurations, it can be determined whether communications between the computer and the communication controller were normally conducted, and the reliability in communications between the computer and the communication controller can be improved. In these cases, when the computer detects an abnormality in communications between the computer and the communication controller, it may store the result of detection of the communication abnormality. In this manner, the operator can be made aware of the abnormality history during maintenance.

A second aspect of the disclosure provides a control method of a protection control apparatus for power conversion circuitry. The protection control apparatus includes a computer, a communication controller, and shutdown circuitry provided on the same chip or the same module as the communication controller. The control method includes: monitoring, by the computer, a plurality of fail signals delivered from the power conversion circuitry to a first number of first signal lines, and creating reject information indicating whether each of the fail signals is enabled or rejected; receiving, by the communication controller, the reject information on each of the fail signals from the computer via a second number of communication lines, and delivering a plurality of reject signals to the first number of second signal lines, based on the reject information; and permitting, by the shutdown circuitry driving of the power conversion circuitry or shut down the power conversion circuitry, based on the fail signals received from the first number of the first signal lines, and the reject signals received from the first number of the second signal lines. The second number is smaller than the first number.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an explanatory view showing one example of the contents of a first transmission packet and a first reply packet;

FIG. 5 is an explanatory view showing one example of the contents of the first transmission packet and first reply packet;

FIG. 6 is an explanatory view showing one example of the manner of communications between the microcomputer and the communication controller according to an RG setting transmission command;

FIG. 7 is an explanatory view showing one example of the content of a communication monitoring process;

FIG. 8 is an explanatory view showing one example of the check content of the first reply packet;

FIG. 9 is an explanatory view showing one example of the contents of a second transmission packet and a second reply packet;

FIG. 10 is an explanatory view showing one example of the contents of the second transmission packet and second reply packet;

FIG. 11 is an explanatory view showing one example of the manner of communications between the microcomputer and the communication controller according to an RG setting reflection command;

FIG. 12 is an explanatory view showing one example of the check content of the second reply packet;

FIG. 13 is an explanatory view showing one example of the operations of power conversion circuitry and the electronic control unit;

FIG. 15 is an explanatory view showing one example of the contents of a third transmission packet and a third reply packet;

FIG. 16 is an explanatory view showing one example of the check content of the third reply packet;

FIG. 17 is an explanatory view showing one example of the operations of the power conversion circuitry and electronic control unit in the case of the modified example;

FIG. 18 is a view schematically showing the configuration of an electronic control unit of a modified example;

FIG. 19 is a view schematically showing the configuration of an electronic control unit of another modified example;

FIG. 20 is a view schematically showing the configuration of an electronic control unit of a further modified example;

FIG. 22 is a flowchart illustrating one example of a control routine of a microcomputer and a communication controller of the second embodiment;

FIG. 23 is an explanatory view showing one example of the contents of a fourth packet, fifth packet, and sixth packet;

FIG. 24 is an explanatory view showing one example of the content of a communication monitoring process;

FIG. 25 is an explanatory view showing one example of the operations of the power conversion circuitry and electronic control unit of the second embodiment;

DETAILED DESCRIPTION OF EMBODIMENTS

Next, some embodiments of the disclosure will be described.

First Embodiment

Figure 1:
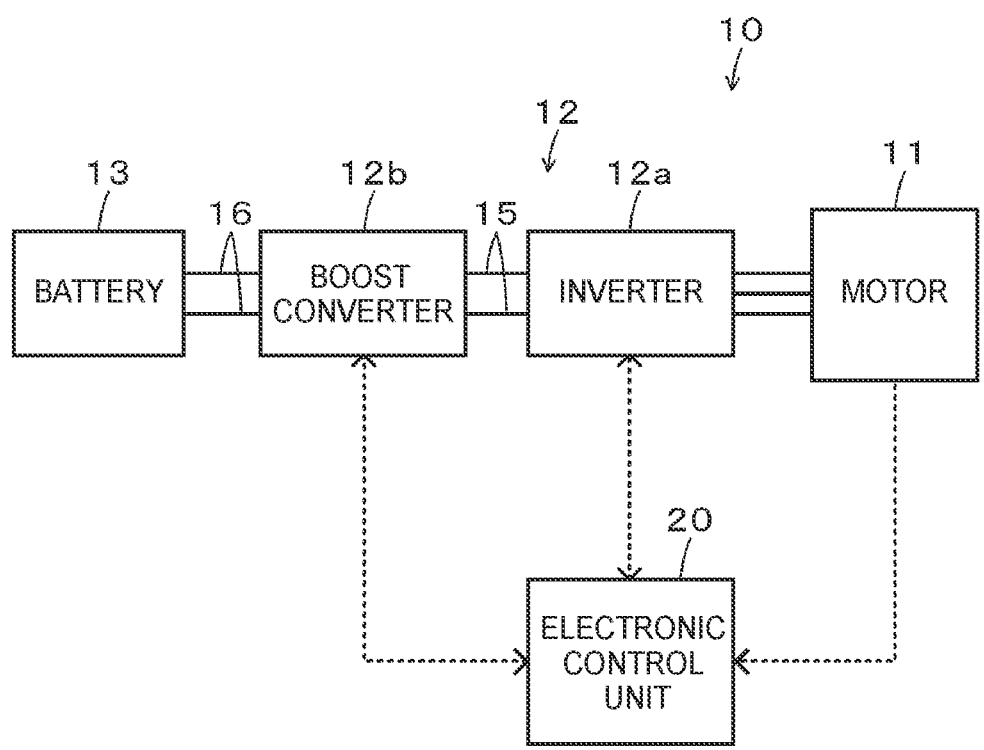
FIG. 1 is a view schematically showing the configuration of a drive system including a protection control apparatus for power conversion circuitry according to a first embodiment of the disclosure.
Figure 2:
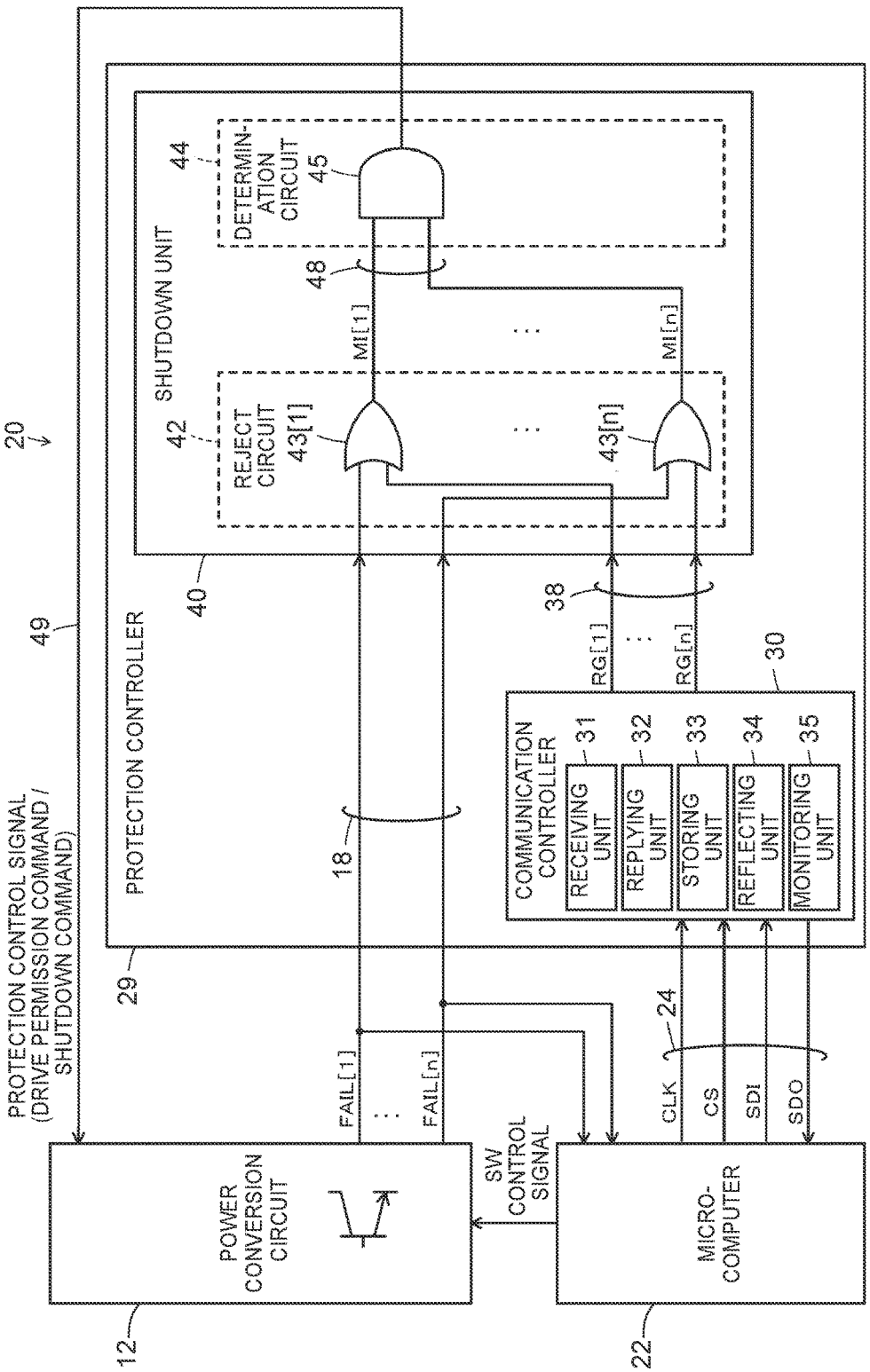
FIG. 2 is a view schematically showing the configuration of an electronic control unit.

FIG. 1 schematically shows the configuration of a drive system 10 including a protection control apparatus for power conversion circuitry as a first embodiment of the disclosure. FIG. 2 schematically shows the configuration of an electronic control unit 20. As shown in FIG. 1, the drive system 10 includes a motor 11, a power conversion circuitry 12, a battery 13, and the electronic control unit 20. In the first embodiment, the power conversion circuitry 12 (an inverter 12a and a boost converter 12b) is an example of the "power conversion circuitry", and the electronic control unit 20 is an example of the "protection control apparatus for the power conversion circuitry".

The motor 11 is in the form of a synchronous generator-motor, for example. The power conversion circuitry 12 includes an inverter 12a and a boost converter 12b. The inverter 12a, which includes two or more switching devices (e.g., six switching devices), converts direct-current power of a power line 15 into alternating-current power and drives the motor 11, through switching of the switching devices. The boost converter 12b, which includes two or more switching devices (e.g., two switching devices), raises the voltage of power of a power line 16 to which the battery 13 is connected, and supplies the resulting power to the power line 15, through switching of the switching devices. The battery 13 is in the form of a lithium-ion secondary battery or a nickel hydride secondary battery, for example. The electronic control unit 20 performs switching control (drive control) on each switching device of the power conversion circuitry 12, or shuts down (stops driving of) the power conversion circuitry 12.

As shown in FIG. 2, the electronic control unit 20 includes a microcomputer 22, and a protection controller 29 having a communication controller 30 and a shutdown unit 40.

The power conversion circuitry 12 is connected to the shutdown unit 40 of the protection controller 29 via "n" pieces of signal lines 18, and delivers fail signals FAIL[1] to FAIL[n] to the "n" pieces of signal lines 18. The value "n" is the number of types of failures of the power conversion circuitry 12, and the number 1 to "n" in each square bracket [ ] corresponds to each type of failure. The above types of failures may include, for example, overcurrent, overheat, opening failure, and closing failure of each switching device of the power conversion circuitry 12, overvoltage of the power line 15, overvoltage of the power line 16, and so forth. When no failure corresponding to the number "i" (i: 1-n)

occurs, the power conversion circuitry 12 sets the fail signal FAIL[i] to a high-level signal in logic level. When a failure corresponding to the number "i" occurs, the power conversion circuitry 12 sets the fail signal FAIL[i] to a low-level signal in logic level.

The microcomputer 22 is constructed as one chip, and has a central processing unit (CPU) (not shown) as its main component. The microcomputer 22 further includes a read-only memory (ROM) in which processing programs are stored, random access memory (RAM) in which data is temporarily stored, input and output ports, and communication ports, as well as the CPU. The microcomputer 22 receives signals from various sensors that detect the rotational position of a rotor of the motor 11, phase current of each phase of the motor 11, voltages of the power lines 15, 16, etc., via the input port. The microcomputer 22 outputs switching control signals to the respective switching devices of the power conversion circuitry 12, via the output port. The input and output of these signals do not constitute the core of the disclosure, and therefore, will not be described in detail.

The microcomputer 22 monitors the fail signals FAIL[1] to FAIL[n] of the "n" pieces of signal lines 18. Also, the microcomputer 22 is connected to the communication controller 30 of the protection controller 29, via four communication lines 24, which are smaller in number than "n". In the first embodiment, the four communication lines 24 consist of three communication lines (CS, CLK, SDI) for transmitting a chip select signal, clock signal, and bit array (packet) of a command from the microcomputer 22 to the communication controller 30, and one communication line (SDO) for sending back a bit array (packet) as an answerback from the communication controller 30 to the microcomputer 22. Further, the microcomputer 22 determines whether each of the fail signals FAIL[1] to FAIL[n] is to be enabled or rejected, based on the fail signals FAIL[1] to FAIL[n], and sends the results of determination as reject information RGi[1] to RGi[n] to the communication controller 30, via the communication lines 24.

The protection controller 29 is constructed as an application specific integrated circuit (ASIC) (one chip). As described above, the communication controller 30 of the protection controller 29 is connected to the microcomputer 22 (to allow communications between chips) via the four communication lines 24, and receives reject information RGi[1] to RGi[n] from the microcomputer 22. Also, the communication controller 30 is connected to the shutdown unit 40 via the "n" pieces of signal lines 38, and delivers reject signals RG[1] to RG[n] to the "n" pieces of signal lines 38, based on the reject information RGi[1] to RGi[n]. To enable the fail signal FAIL[i] corresponding to the number "i" (i: 1-n), the communication controller 30 sets the reject signal RG[i] to a low-level signal in logic level. To reject (mask) the fail signal FAIL[i] corresponding to the number "i", the communication controller 30 sets the reject signal RG[i] to a high-level signal in logic level.

Also, the communication controller 30 includes a receiving unit 31, replying unit 32, storing unit 33, reflecting unit 34, and monitoring unit 35, as functional blocks. The receiving unit 31 receives a bit array (packet) from the microcomputer 22, and latches (temporarily stores) it in a first region of a RAM (not shown). The replying unit 32 sends back a packet as an answerback to the microcomputer 22. The storing unit 33 stores the reject information RGi[1] to RGi[n] included in the latched bit array (packet), in a second region of the RAM. The reflecting unit 34 reflects the stored reject information RGi[1] to RGi[n] in the reject signals RG[1] to RG[n]. The monitoring unit 35 monitors communications with the microcomputer 22 via the communication lines 24.

The shutdown unit 40 of the protection controller 29 is configured as a logic circuit, and includes a reject circuit 42 having the "n" pieces of OR circuits 43[i] to 43[$n$], and a determination circuit 44 having an AND circuit 45.

The reject circuit 42 is connected to the power conversion circuitry 12 via the "n" pieces of signal lines 18, and is connected to the communication controller 30 via the "n" pieces of signal lines 38. Further, the reject circuit 42 is connected to the determination circuit 44 via the "n" pieces of signal lines 48. Each OR circuit 43[i] (i:1-n) of the reject circuit 42 sets a middle signal MI[i] delivered to the corresponding signal line 48 to a high-level signal in logic level, when at least one of the fail signal FAIL [i] received from the power conversion circuitry 12 via the corresponding signal line 18, and the reject signal RG[i] received from the communication controller 30 via the corresponding signal line 38, is a high-level signal. Each OR circuit 43[i] sets the middle signal MI[i] to a low-level signal in logic level, when both of the fail signal FAIL[i] and the reject signal RG[i] are low-level signals.

The determination circuit 44 is connected to the reject circuit 42 via the "n" pieces of signal lines 48, and is connected to the power conversion circuitry 12 via a single signal line 49. The AND circuit 45 of the determination circuit 44 sets a protection control signal delivered to the signal line 49 to a high-level signal in logic level when all of the middle signals MI[1] to MI[n] received from the OR circuits 43[1] to 43[$n$] via the signal lines 48 are high-level signals. The AND circuit 45 sets the protection control signal to a low-level signal in logic level when at least one of the middle signals MI[1] to MI[n] is a low-level signal. The protection control signal set to the high level corresponds to a drive permission command to permit drive control of the power conversion circuitry 12, and the protection control signal set to the low level corresponds to a shutdown command to shut down (stop driving of) the power conversion circuitry 12. When the protection control signal is a high-level signal (drive permission command), the power conversion circuitry 12 is driven under control according to switching commands from the microcomputer 22. When the protection control signal is a low-level signal (shutdown command), the power conversion circuitry 12 is shut down (driving is stopped) irrespective of the presence of switching commands from the microcomputer 22.

In the shutdown unit 40 thus configured, when all of the fail signals FAIL[1] to FAIL[n] from the power conversion circuitry 12 are high-level signals (when no failure occurs), all of the middle signals MI[1] to MI[n] become high-level signals, and the protection control signal becomes a high-level signal (drive permission command).

On the other hand, when at least one of the fail signals FAIL[1] to FAIL[n]received from the power conversion circuitry 12 is a low-level signal (when at least one type of failure occurs), the electronic control unit 20 operates as follows. Suppose a fail signal FAIL[j] of number "j" (j: one of 1-"n") is a low-level signal. In this case, when the reject signal RG[j] received from the communication controller 30 is a low-level signal (when the fail signal FAIL[j] is enabled), the middle signal MI[j] becomes a low-level signal, and the protection control signal becomes a low-level signal (shutdown command). On the other hand, when the reject signal RG[j] from the communication controller 30 is a high-level signal (when the fail signal FAIL[j] is rejected), the middle signal MI[j] becomes a high-level signal, and the protection control signal becomes a high-level signal (drive permission command) if all of the middle signals MI[1] to MI[n] are high-level signals.

Figure 3:
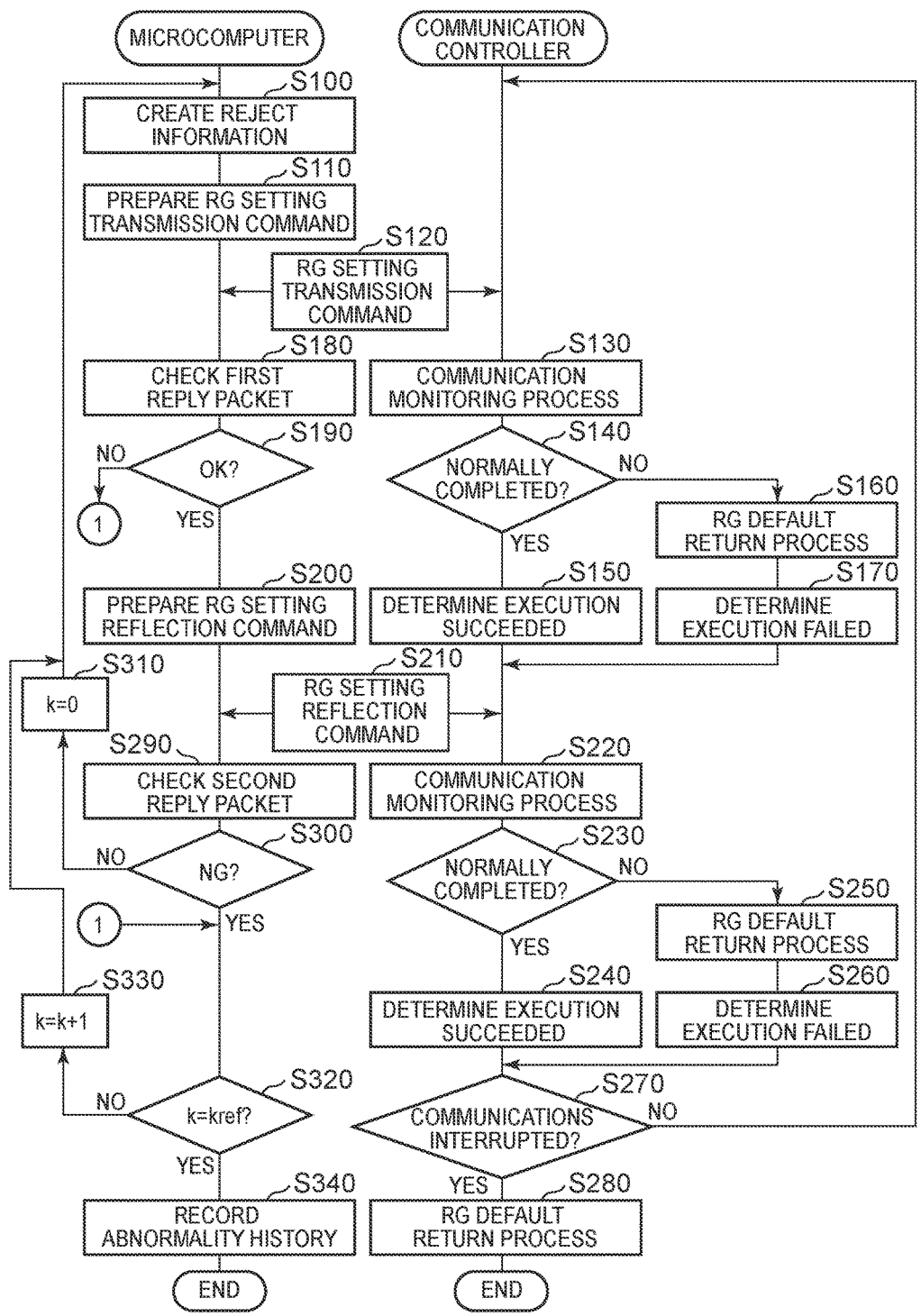
FIG. 3 is a flowchart illustrating one example of a control routine of a microcomputer and a communication controller of the first embodiment.

Next, operation of the electronic control unit 20 of the first embodiment configured as described above, in particular, a control routine of the microcomputer 22 and communication controller 30, will be described. In the following description of the first embodiment, it is assumed that the value "n" representing the number of types of failures in the power conversion circuitry 12 is 12. FIG. 3 is a flowchart illustrating one example of the control routine of the microcomputer 22 and communication controller 30. The control routine of FIG. 3 starts being executed when at least one of the fail signals FAIL[1] to FAIL[12] that are being monitored by the microcomputer 22 becomes a low-level signal (when at least one type of fail occurs).

In the control routine of FIG. 3, the microcomputer 22 initially creates reject information RGi[1] to RGi[12] (step S100). In this operation, the microcomputer 22 determines whether each of the fail signals FAIL[1] to FAIL[12] is enabled or rejected, based on the fail signals FAIL[1] to FAIL[12], and creates reject information RGi[1] to RGi[12] from the results of determination. In the first embodiment, the reject information RGi[i] is set to value 0, when the fail signal FAIL[i] corresponding to number "i" (i=1-n) is a high-level signal, or when the fail signal FAIL[i] is a low-level signal and the fail signal FAIL[i] is enabled. The reject information RGi[i] is set to value 1, when the fail signal FAIL[i] is a low-level signal and the fail signal FAIL[i] is rejected. Whether the fail signal FAIL[i] is enabled or rejected when the fail signal FAIL[i] is a low-level signal is determined according to a result obtained by determining whether limp-home traveling is permitted, based on various types of information.

Subsequently, the microcomputer 22 prepares an RG setting transmission command by creating a first transmission packet including the reject information RGi[1] to RGi[12] (step S110), and the microcomputer 22 and the communication controller 30 execute the RG setting transmission command (step S120). According to the RG setting transmission command, the microcomputer 22 sends the first transmission packet to the communication controller 30. In the communication controller 30, the receiving unit 31 receives and latches the first transmission packet, and the storing unit 33 stores the reject information RGi[1] to RGi[12] included in the first transmission packet, while the replying unit 32 sends back a first reply packet as an answerback A, to the microcomputer 22.

FIG. 4 and FIG. 5 show one example of the contents of the first transmission packet and the first reply packet, and FIG. 6 shows one example of the manner of communications between the microcomputer 22 and the communication controller 30 according to the RG setting transmission command. As shown in FIG. 4 and FIG. 5, each of the first transmission packet and the first reply packet is a 15-bit (bit0 to bit14) packet.

The first transmission packet will be specifically described. The bit0 is a start bit (bit that informs a packet start), and is set to value 1 in the first embodiment. The bit1 is a command bit (bit that means that the packet in question is an RG setting transmission command), and is set to value 0 in the first embodiment. The bit2 to bit13 are bits of the reject information RGi[1] to RGi[12]. The bit14 is a parity bit, and is set based on a predetermined form, such as even parity or odd parity.

The first reply packet will be specifically described. The "bit0" is a start bit, and is set to value 1 in the first embodiment. With the bit1 to bit13, the values of bit1 to bit13 of the first transmission packet received from the microcomputer 22 are returned as they are. The bit14 indicates the result of execution of the last command (the RG setting transmission command or an RG setting reflection command that will be described later). The bit14 is set to value 1 when the last command was successfully executed, and is set to value 0 when execution of the last command failed. When the RG setting transmission command is executed for the first time, the bit14 is set to value 1 since there is no last command.

As shown in FIG. 6, in communications between the microcomputer 22 and the communication controller 30 according to the RG setting transmission command, after the microcomputer 22 switches the chip select signal from a high-level signal to a low-level signal in logic level, it outputs, as the clock signal, a signal of 16 clocks (pulses) of a clock period Tc by switching between a low-level signal and a high-level signal in logic level, and then switches the chip select signal to the high-level signal. Also, the microcomputer 22 sends the first transmission packet (packet as described above in FIG. 4 and FIG. 5), in the order of bit0 to bit14, over a period from a point in time earlier by substantially a half period of the clock period Tc than a rise of the first clock of the clock signal, to substantially the same time as a fall of the 15th clock of the clock signal. In the communication controller 30, the receiving unit 31 recognizes and latches bits (bit0 to bit14) that are being received, at times corresponding to the respective rises of the clock signal, and the storing unit 33 stores bits (bit2 to bit13) of the reject information RGi[1] to RGi[12] among the latched bits. Also, the replying unit 32 of the communication controller 30 sends back the first reply packet (packet as described above in FIG. 4 and FIG. 5), in the order of bit0 to bit14, over a period from substantially the same time as a fall of the first clock of the clock signal, to substantially the same time as a fall of the 16th clock of the clock signal.

Upon completion of execution of the RG setting transmission command in step S120, the communication controller 30 performs a communication monitoring process, so as to determine whether the first transmission packet has normally been received (step S130, S140). FIG. 7 shows one example of the content of the communication monitoring process. As shown in FIG. 7, in the communication monitoring process, packet interval monitoring, parity monitoring, header monitoring, clock number monitoring, and data monitoring are performed.

In the packet interval monitoring, the interval of low-level signals in the chip select signal (duration of high-level signal) is monitored, and the interval of low-level signals is determined to be normal when it is shorter than a predetermined time Tint (e.g., 90 msec, or 100 msec, or 110 msec), and is determined to be abnormal when the interval of low-level signals is equal to or longer than the predetermined time Tint.

In the packet parity monitoring, each time one packet is received, the parity bit is monitored, using the bits (bit0 to bit13) subjected to parity check, and the parity bit (bit14). The parity bit is determined to be normal when it is OK (when it matches a predetermined form), and is determined to be abnormal when it is NG (when it does not match the predetermined form).

In the packet header monitoring, each time one packet is received, the start bit and the command bit are monitored, and the start bit and command bit are determined to be normal when they are a specified combination (for example, "1" and "0" in the RG setting transmission command), and are determined to be abnormal when they are not the specified combination.

In the packet clock number monitoring, each time one packet is received, the clock number is monitored, and is determined to be normal when the number of clocks is 16, while the clock number is determined to be abnormal when it is other than 16.

In the packet data monitoring, each time one packet is received, the data bits are monitored. In the case where the current time is immediately after completion of execution of the RG setting transmission command, the data monitoring is ignored (it is not determined whether the data bits are normal or abnormal). In the case where the current time is immediately after completion of execution of the RG setting reflection command that will be described later, the data bits are determined to be normal when all of the bit2 to bit13 are zero, and are determined to be abnormal when any of the "bit2" to "bit13" is not zero.

In the first embodiment, the communication controller 30 determines that the first transmission packet has been normally received, when all of the packet interval, parity, header, clock number, and data were determined to be normal. Also, in the communication monitoring process, the communication controller 30 determines that the first transmission packet has not been normally received, when at least one of the packet interval, parity, header, clock number, and data was determined to be abnormal. By executing the communication monitoring process, the communication controller 30 can determine whether the first transmission packet has been normally received, and the reliability of communications between the microcomputer 22 and the communication controller 30 can be improved.

When the communication controller 30 determines in steps S130, S140 that the first transmission packet has been normally received, it determines that the RG setting transmission command was successfully executed (step S150). On the other hand, when the communication controller 30 determines that the first transmission packet has not been normally received, it carries out an RG default return process (step S160), and determines that execution of the RG setting transmission command failed (step S170). In the RG default return process, the storing unit 33 re-stores all of the bit2 to bit13 corresponding to the reject information RGi[1] to RGi[12], as having value 0, and the reflecting unit 34 sets all of the reject signals RG[1] to RG[12] to low-level signals.

Upon completion of execution of the RG setting transmission command in step S120, the microcomputer 22 performs checking operation on the first reply packet received from the communication controller 30 according to the RG setting transmission command (steps S180, S190). FIG. 8 shows one example of the check content of the first reply packet. As shown in FIG. 8, in the checking of the first reply packet, the microcomputer 22 determines whether the value of bit0 is 1, whether the value of bit1 is 0, whether the values of bit2 to bit13 coincide with the transmitted values of the first transmission packet, and whether the value of bit14 is 1.

When the value of bit0 is 1, the value of bit1 is 0, the values of bit2 to bit13 coincide with the transmitted values of the first transmission packet, and the value of bit14 is 1, the result of checking of the first reply packet is OK. On the other hand, when the value of bit0 is 0, or the value of bit1 is 1, or at least one of the values of bit2 to bit13 does not coincide with the transmitted value(s) of the first transmission packet, or the value of bit14 is 0, the result of checking of the first reply packet is NG By performing the checking operation on the first reply packet, the microcomputer 22 can determine whether the RG setting transmission command was normally executed, and the reliability in communications between the microcomputer 22 and the communication controller 30 can be improved.

When the result of checking of the first reply packet is OK in steps S180, S190, the microcomputer 22 prepares (creates) a second transmission packet, so as to prepare an RG setting reflection command (step S200), and the microcomputer 22 and the communication controller 30 execute the RG setting reflection command (step S210). According to the RG setting reflection command, the microcomputer 22 sends the second transmission packet to the communication controller 30. In the communication controller 30, the receiving unit 31 receives and latches the second transmission packet, and the reflecting unit 34 reflects the reject information RGi[1] to RGi[12] stored according to the RG setting transmission command, in the reject signals RG[1] to RG[12], while the replying unit 32 sends back a second reply packet as an answerback B, to the microcomputer 22. The reflecting unit 34 sets the reject signal RG[i] to a low-level signal when the reject information RGi[i] of number "i" (i: 1-12) is value 0, and sets the reject signal RG[i] to a high-level signal when the reject information RGi[i] is value 1.

FIG. 9 and FIG. 10 show one example of the contents of the second transmission packet and the second reply packet, and FIG. 11 shows one example of the manner of communications between the microcomputer 22 and the communication controller 30 according to the RG setting reflection command. As shown in FIG. 9 and FIG. 10, each of the second transmission packet and the second reply packet is a 15-bit packet having 15 bits (bit0 to bit14).

The second transmission packet will be specifically described. The bit0 is a start bit, and is set to value 1 in the first embodiment. The bit1 is a command bit (bit that means that the packet in question is an RG setting reflection command), and is set to value 1 in the first embodiment. The bit2 to bit13 are command bits like bit1, and are set to value 0 in the first embodiment. The bit14 is a parity bit, and is set based on a predetermined form, such as even parity or odd parity.

The second reply packet will be specifically described. The bit0 is a start bit, and is set to value 1 in the first embodiment. The bit1 is a bit with which the value of bit1 of the second transmission packet received from the microcomputer 22 is returned as it is. The bit2 to bit13 are bits indicating the reflection results of the reject signals RG[1] to RG[12] by the reflecting unit 34. Each of the bit2 to bit13 is set to value 0 when the corresponding reject signal is a low-level signal, and is set to value 1 when the corresponding reject signal is a high-level signal. The bit14 indicates the result of execution of the last command (the above RG setting transmission command). The bit14 is set to value 1 when the last command was successfully executed, and is set to 0 when the execution of the last command failed.

As shown in FIG. 11, in communications between the microcomputer 22 and the communication controller 30 according to the RG setting reflection command, after the microcomputer 22 switches the chip select signal from a high-level signal to a low-level signal in logic level, it outputs, as the clock signal, a signal of 16 clocks (pulses) of a clock period Tc by switching between a low-level signal and a high-level signal in logic level, and then switches the chip select signal to the high-level signal. Also, the microcomputer 22 sends the second transmission packet (packet as described above in FIG. 9 and FIG. 10), in the order of bit0 to bit14, over a period from a point in time earlier by substantially a half period of the clock period Tc than a rise of the first clock of the clock signal, to substantially the same time as a fall of the 15th clock of the clock signal. In the communication controller 30, the receiving unit 31 recognizes and latches the bits (bit0 to bit14) that are being received, at times corresponding to respective rises of the clock signal, and the reflecting unit 34 reflects the reject information RGi[1] to RGi[12] stored in response to the RG setting transmission command, in the reject signals RG[1] to RG[12], when bit2 to bit13 are being received. Further, the replying unit 32 of the communication controller 30 sends back the second reply packet (packet as described above in FIG. 9 and FIG. 10), in the order of bit0 to bit14, over a period from substantially the same time as the fall of the first clock of the clock signal, to substantially the same time as the fall of the 16th clock of the clock signal.

Upon completion of execution of the RG setting reflection command in step S210 in this manner, the communication controller 30 performs the above communication monitoring process (see FIG. 7), so as to determine whether the second transmission packet has been normally received (steps S220, S230). By executing the communication monitoring process, the communication controller 30 can determine whether the second transmission packet has been normally received, and the reliability in communications between the microcomputer 22 and the communication controller 30 can be improved.

When the communication controller 30 determines in steps S220, S230 that the second transmission packet has been normally received, it determines that the RG setting reflection command was successfully executed (step S240). On the other hand, when the communication controller 30 determines that the second transmission packet has not been normally received, it executes the RG default return process as described above (step S250), and determines that execution of the RG setting reflection command failed (step S260).

Subsequently, the communication controller 30 determines, through the packet interval monitoring, whether communications with the microcomputer 22 are interrupted (step S270). When the communication controller 30 determines that the communications with the microcomputer 22 are not interrupted, it returns to the start of the routine. After returning to the start, the communication controller 30 waits for execution of the RG setting transmission command in step S120 of the next cycle. On the other hand, when the communication controller 30 determines that the communications with the microcomputer 22 are interrupted, it executes the above RO default return process (step S280), and this routine ends.

Upon completion of execution of the RG setting reflection command in step S210, the microcomputer 22 performs checking operation on the second reply packet received from the communication controller 30 according to the RG setting reflection command (steps S290, S300). FIG. 12 shows one example of the check content of the second reply packet. As shown in FIG. 12, in the checking of the second reply packet, the microcomputer 22 determines whether the value of bit0 is 1, whether the value of bit1 is 1, whether the values of bit2 to bit13 coincide with the transmitted values of the first transmission packet (RG setting transmission command), and whether the value of bit14 is 1.

When the value of bit0 is 1, the value of bit1 is 1, the values of bit2 to bit13 coincide with the transmitted values of the first transmission packet (RG setting transmission command), and the value of bit14 is 1, the check result of the second reply packet is OK. On the other hand, when the value of bit0 is 0, or the value of bit1 is 0, or at least one of the values of bit2 to bit13 does not coincide with the transmitted value or values of the first transmission packet (the transmitted value(s) of the RG setting transmission command), or the value of bit14 is 0, the check result of the second reply packet is NG By performing the checking operation on the second reply packet, the microcomputer 22 can determine whether the RG setting transmission command and the RG setting reflection command were normally executed (the reject information RGi[1] to RGi[12] was normally reflected by the reject signals RG[1] to RG[12]), and the reliability in communications between the microcomputer 22 and the communication controller 30 can be improved.

When the check result of the second reply packet is OK in steps S290, S300, the number of times of retry "k" is set to value 0 (step S310), and the control returns to step S100. In this manner, the microcomputer 22 and the communication controller 30 alternately and repeatedly execute the RG setting transmission command and the RG setting reflection command, so that the reject information RGi[1] to RGi[12] is transmitted from the microcomputer 22 to the communication controller 30, and the communication controller 30 reflects the reject information RGi[1] to RGi[12] in the reject signals RG[1] to RG[12]. Then, the shutdown unit 40 sets the protection control signal to the drive permission command or shutdown command, based on the fail signals FAIL[1] to FAIL[12] from the power conversion circuitry 12 and the reject signals RG[1] to RG[12] from the communication controller 30.

When the check result of the first reply packet is NG in steps S180, S190, or when the check result of the second reply packet is NG in steps S290, S300, the number of times of retry "k" is compared with a threshold value kref (step S320). When the number of times of retry "k" is smaller than the threshold value kref, the number of times of retry "k" is incremented by value 1 (step S330), and the control returns to step S100. Here, value 3, value 4, or value 5, for example, is used as the threshold value kref. When the number of times of retry "k" is equal to the threshold value kref in step S320, an abnormality in communications between the microcomputer 22 and the communication controller 30 is detected (confirmed), and an abnormality history is recorded in a recording area (not shown) of the RAM, or the like, of the microcomputer 22 (step S340), and this routine ends. With the abnormality history thus recorded in the RAM of the microcomputer 22, the operator can be made aware of the abnormality history during maintenance.

FIG. 13 shows one example of the operations of the power conversion circuitry 12 and the electronic control unit 20. As shown in FIG. 13, when no failure occurs to the power conversion circuitry 12 (before time t1), the reject circuit 42 enables the fail signals, and the protection control signal from the determination circuit 44 is the drive permission command, so that the power conversion circuitry 12 is driven under control according to switching commands from the microcomputer 22. At this time, no communications are conducted between the microcomputer 22 and the communication controller 30.

When a failure occurs to the power conversion circuitry 12 (time t1), the protection control signal from the determination circuit 44 becomes the shutdown command since the reject circuit 42 enables the fail signals, and driving of the power conversion circuitry 12 is stopped. At this time, too, no communications are conducted between the microcomputer 22 and the communication controller 30.

When the microcomputer 22 determines that it rejects any fail signal from the power conversion circuitry 12 (time t2), the microcomputer 22 and the communication controller 30 execute the RG setting transmission command (transmission of the first transmission packet and the first reply packet, storage of the reject information included in the first transmission packet), and then execute the RG setting reflection command (transmission of the second transmission packet and the second reply packet, reflection of the reject information onto the reject signals). Then, the reject circuit 42 rejects the fail signal, and the protection control signal from the determination circuit 44 becomes the drive permission command, so that drive control of the power conversion circuitry 12 by the microcomputer 22 is resumed. Thereafter, the microcomputer 22 and the communication controller 30 alternately and repeatedly execute the RG setting transmission command and the RG setting reflection command. In this manner, the reject information is sequentially reflected by the reject signals.

The electronic control unit 20 of the first embodiment as described above includes the microcomputer 22, communication controller 30, and shutdown unit 40, and the communication controller 30 and the shutdown unit 40 are formed on the ASIC (one chip). The power conversion circuitry 12 and the shutdown unit 40 are connected via the "n" pieces (the number of types of failures of the power conversion circuitry 12) of signal lines 18, and the communication controller 30 and the shutdown unit 40 are connected via the "n" pieces of signal lines 38, while the microcomputer 22 and the communication controller 30 are connected via four communication lines 24, which are smaller in number than the "n" pieces. Thus, the number of the communication lines 24 that connect the microcomputer 22 with the communication controller 30 can be made relatively small, and the number of the communication lines 24 is less likely or unlikely to be increased when the number of the signal lines 18 (the number of types of failures of the power conversion circuitry 12) is increased. As a result, the failure rate is less likely or unlikely to be increased. Also, the number of the signal lines 18 for the fail signals FAIL[1] to FAIL[n] is equal to the number of the signal lines 38 for the reject signals RG[1] to RG[n]; therefore, when an abnormality occurs to one of the signal lines 38 (which is fixed to a high-level signal, for example), two or more fail signals FAIL[1] to FAIL[n] are prevented from being rejected.

In the electronic control unit 20 of the first embodiment, when execution of the RG setting transmission command or the RG setting reflection command is completed, the communication controller 30 determines whether the first transmission packet or the second transmission packet has been normally received, through the communication monitoring process. Also, when execution of the RG setting transmission command or the RG setting reflection command is completed, the microcomputer 22 performs checking operation on the first reply packet or the second reply packet. In this manner, the reliability in communications between the microcomputer 22 and the communication controller 30 can be improved. Further, when an abnormality occurs to communications between the microcomputer 22 and the communication controller 30, it is possible to specify the bit of the packet to which the abnormality occurred.

In the electronic control unit 20 of the first embodiment, the communication controller 30 performs the communication monitoring process upon completion of execution of the RG setting transmission command or the RG setting reflection command. However, the communication monitoring process may not be performed.

In the electronic control unit 20 of the first embodiment, the microcomputer 22 performs the checking operation on the first reply packet or the second reply packet, upon completion of execution of the RG setting transmission command or the RG setting reflection command. However, the checking operation may not be performed on the first reply packet or the second reply packet.

Figure 14:
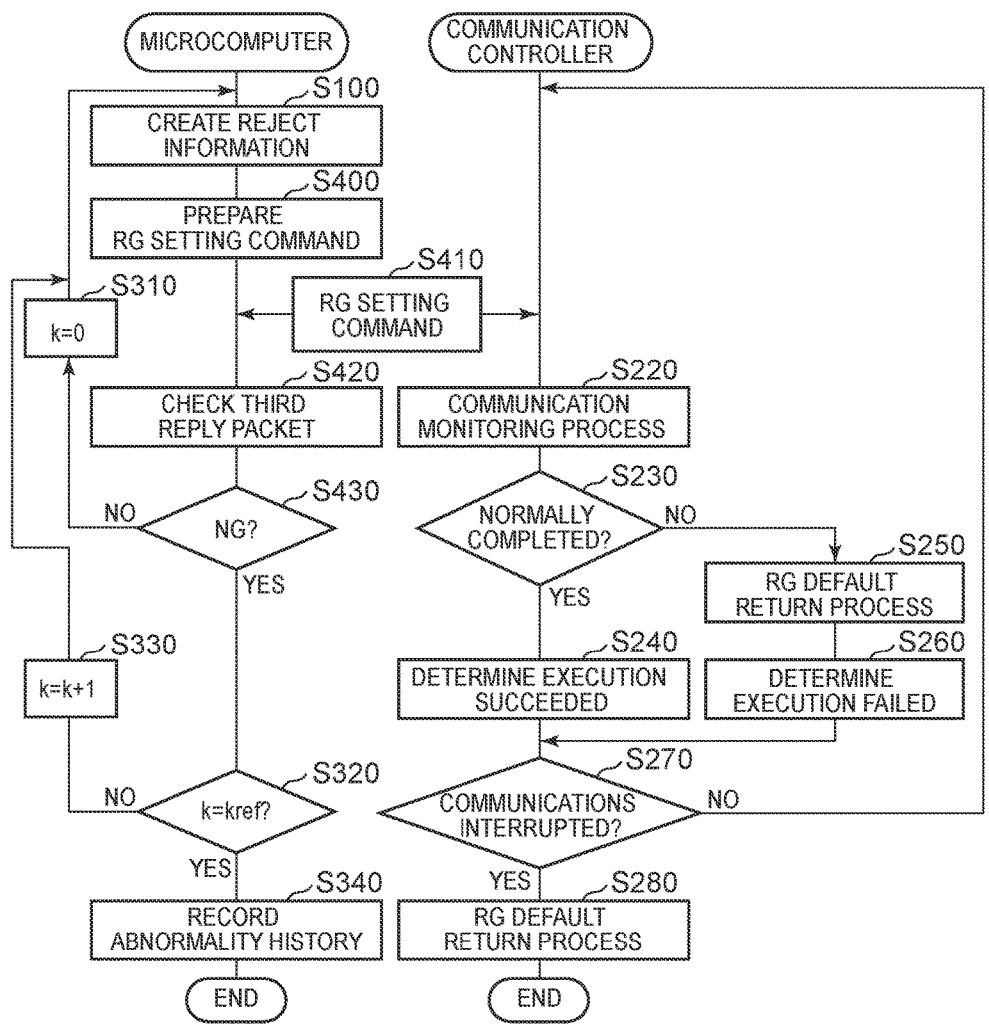
FIG. 14 is a flowchart illustrating one example of a control routine of the microcomputer and communication controller of a modified example.

In the electronic control unit 20 of the first embodiment, the control routine of the microcomputer 22 and the communication controller 30 as shown in FIG. 3 is executed. However, a control routine of the microcomputer 22 and the communication controller 30 as shown in FIG. 14 may be executed, in place of that of FIG. 3. The control routine of FIG. 14 is identical with that of FIG. 3, except that steps S400 to S430 are executed, in place of steps S110 to S210, S290, and S300. Thus, the same step numbers are assigned to the same operations, of which detailed description will not be provided.

In the control routine of FIG. 14, the microcomputer 22 creates the reject information RGi[1] to RGi[12] in step S100, and creates a third transmission packet including the reject information RGi[1] to RGi[12], so as to prepare an RG setting command (step S400). Then, the microcomputer 22 and the communication controller 30 execute the RG setting command (step S410). By executing the RG setting command, the microcomputer 22 sends the third transmission packet to the communication controller 30. In the communication controller 30, the receiving unit 31 receives and latches the third transmission packet, and the storing unit 33 stores the reject information RGi[1] to RGi[12] included in the third transmission packet. Also, the reflecting unit 34 reflects the reject information RGi[1] to RGi[12] in the reject signals RG[1] to RG[12], and the replying unit 32 sends back a third reply packet as an answerback C, to the microcomputer 22.

FIG. 15 shows one example of the contents of the third transmission packet and third reply packet. As shown in FIG. 15, each of the third transmission packet and the third reply packet has 15 bits (bit0 to bit14). The third transmission packet is the same packet as the above first transmission packet (see FIG. 4 and FIG. 5), and the third reply packet is the same packet as the above second reply packet (see FIG. 9 and FIG. 10). Also, communications between the microcomputer 22 and the communication controller 30 according to the RG setting command are performed in the same manner as those in which the "first transmission packet" of FIG. 6 is replaced with the "third transmission packet", and the "storing unit" is replaced with the "storing unit and reflecting unit", while the "first reply packet" is replaced with the "third reply packet".

Upon completion of execution of the RG setting command in step S410, the communication controller 30 proceeds to the above step S220. In this case, packet data monitoring in the communication monitoring process (see FIG. 7) is performed in the same manner as that immediately after completion of execution of the RG setting transmission command (see FIG. 7).

Also, upon completion of execution of the RG setting command in step S410, the microcomputer 22 performs checking operation on the third reply packet received from the communication controller 30 according to the RG setting command (steps S420, S430). FIG. 16 shows one example of the check content of the third reply packet. As shown in FIG. 16, in the checking operation on the third reply packet, the microcomputer 22 determines whether the value of bit0 is 1, whether the value of bit1 is 1, whether the values of bit2 to bit13 coincide with the transmitted values of the third transmission packet, and whether the value of bit14 is 1.

When the value of bit0 is 1, the value of bit1 is 1, the values of bit2 to bit13 coincide with the transmitted values of the third transmission packet, and the value of bit14 is 1, the check result of the third reply packet is OK. On the other hand, when the value of bit0 is 0, or the value of bit1 is 0, or at least one of bit2 to bit13 does not coincide with the corresponding transmitted value(s) of the third transmission packet, or the value of bit14 is 0, the check result of the third reply packet is NG By performing the checking operation on the third reply packet, the microcomputer 22 can determine whether the RG setting command was normally executed, and the reliability in communications between the microcomputer 22 and the communication controller 30 can be improved.

When the check result of the third reply packet is OK in steps S420, S430, the microcomputer 22 proceeds to the above step S310. On the other hand, when the check result of the third reply packet is NG in steps S420, S430, the microcomputer 22 proceeds to the above step S320.

The microcomputer 22 and the communication controller 30 repeatedly execute the RG setting command, so that the reject information RGi[1] to RGi[12] is transmitted from the microcomputer 22 to the communication controller 30, and the communication controller 30 reflects the reject information RGi[1] to RGi[12] in the reject signals RG[1] to RG[12], as in the first embodiment. Then, the shutdown unit 40 sets the protection control signal to the drive permission command or shutdown command, based on the fail signals FAIL[1] to FAIL[12] from the power conversion circuitry 12 and the reject signals RG[1] to RG[12] from the communication controller 30.

FIG. 17 shows one example of the operations of the power conversion circuitry 12 and electronic control unit 20 in the case of the modified example. In FIG. 17, the operations prior to time t12 are identical with those prior to time t2 in FIG. 13. As shown in FIG. 17, when the microcomputer 22 determines that it rejects any fail signal from the power conversion circuitry 12 (time t12), the microcomputer 22 and the communication controller 30 execute the RG setting command (transmission of the third transmission packet and the third reply packet, storage of the reject information included in the third transmission packet, and reflection of the reject information onto the reject signals). Then, the reject circuit 42 rejects the fail signal, and the protection control signal from the determination circuit 44 becomes the drive permission command, so that drive control of the power conversion circuitry 12 by the microcomputer 22 is resumed. Thereafter, the microcomputer 22 and the communication controller 30 repeatedly execute the RG setting command. As a result, the reject information is sequentially reflected by the reject signals.

In the electronic control unit 20 of the modified example, the communication controller 30 performs the communication monitoring process upon completion of execution of the RG setting command. However, the communication monitoring process may not be performed.

Also, in the electronic control unit 20 of the modified example, the microcomputer 22 performs the checking operation on the third reply packet, upon completion of execution of the RG setting command. However, the checking operation may not be performed on the third reply packet.

In the electronic control unit 20 of the first embodiment, the microcomputer 22 and the communication controller 30 are connected via four communication lines (CS, CLK, SDI, SDO) 24, as shown in FIG. 2. Namely, a communication physical layer is arranged to enable four-wire serial communications. However, as shown in an electronic control unit 20B of a modified example of FIG. 18, the microcomputer 22 and the communication controller 30 may be connected via three communication lines (CLK, SDI, SDO) 24B, namely, a communication physical layer may be arranged to enable three-wire serial communications. Also, as shown in an electronic control unit 20C of a modified example of FIG. 19, the microcomputer 22 and the communication controller 30 may be connected via two communication lines (TxD, RxD) 24C, namely, a communication physical layer may be arranged to provide a universal asynchronous receiver-transmitter (UART) (asynchronous serial communications). Further, as shown in an electronic control unit 20D of a modified example of FIG. 20, the microcomputer 22 and the communication controller 30 may be connected via a single communication line 24D for two-way communications. Namely, a communication physical layer may be arranged to provide one wire (a two-way communication data bus).

Second Embodiment

Figure 21:
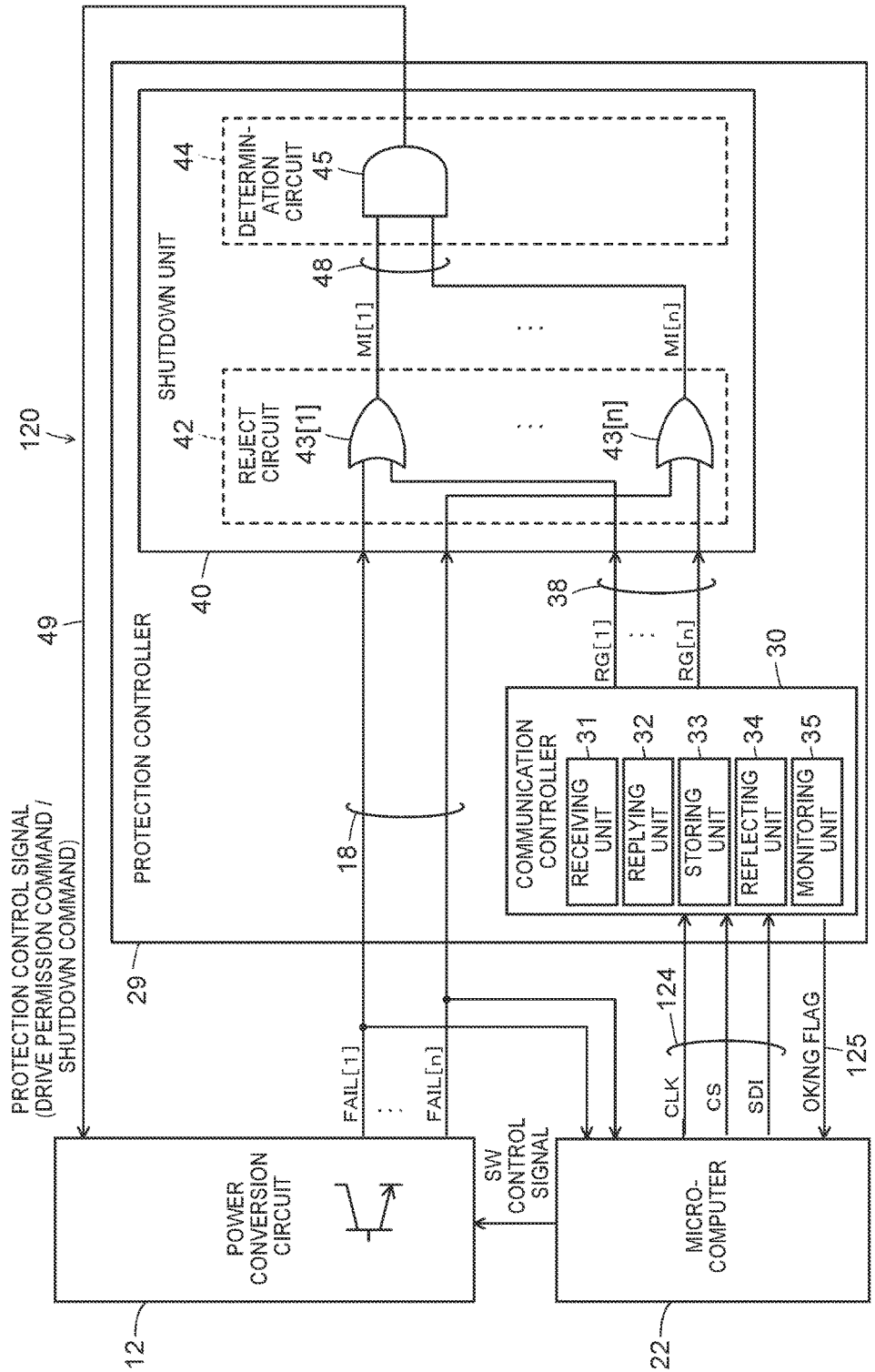
FIG. 21 is a view schematically showing the configuration of an electronic control unit according to a second embodiment.

Next, an electronic control unit 120 according to a second embodiment of the disclosure will be described. FIG. 21 schematically shows the configuration of the electronic control unit 120 of the second embodiment. The electronic control unit 120 of the second embodiment is identical with the electronic control unit 20 of the first embodiment as shown in FIG. 2, except that the microcomputer 22 and the communication controller 30 are connected via three communication lines (CS, CLK, SDI) 124 and one signal line 125, instead of being connected via the four communication lines (CS, CLK, SDI, SDO) 24. Thus, the same reference numerals are assigned to the same constituent elements of the electronic control unit 120 as those of the electronic control unit 20, and detailed description of these elements will not be provided. In the electronic control unit 120, the microcomputer 22 does not receive any packet from the communication controller 30. With this arrangement, the resource of the microcomputer 22 for communications can be reduced, resulting in reduction of the cost of the microcomputer 22, and increase of choices of the microcomputer 22. On the other hand, when an abnormality in communications between the microcomputer 22 and the communication controller 30 occurs, it is impossible to specify the bit of the packet to which the abnormality occurred, as in the electronic control unit 20 of the first embodiment.

In the electronic control unit 120, a control routine of the microcomputer 22 and communication controller 30 as shown in FIG. 22 is executed, in place of the control routine of the microcomputer 22 and communication controller 30 as shown in FIG. 3. The control routine of FIG. 22 is identical with that of FIG. 3, except that steps S500 to S700 are executed in place of steps S110 to S210, S290, and S300. Thus, the same step numbers are assigned to the same operations, of which detailed description will not be provided. In the second embodiment, too, value "n" representing the number of types of failures in the power conversion circuitry 12 is 12, as in the first embodiment.

In the routine of FIG. 22, the microcomputer 22 creates the reject information RGi[1] to RGi[12] in step S100, and creates a fourth packet including the reject information RGi[1] to RGi[12], to thus prepare an RG setting transmission command (step S500). Then, the microcomputer 22 and the communication controller 30 execute the RG setting transmission command (step S510). With the RG setting transmission command of this routine thus executed, the microcomputer 22 sends the fourth packet to the communication controller 30, and the receiving unit 31 of the communication controller 30 receives and latches the fourth packet.

FIG. 23 shows one example of the contents of the fourth packet, a fifth packet (which will be described later), and a sixth packet (which will be described later). As shown in FIG. 23, the fourth packet has 15 bits (bit0-bit14), and is the same packet as the first transmission packet (see FIG. 4 and FIG. 5). Also, communications between the microcomputer 22 and the communication controller 30 according to the RG setting transmission command of this routine are conducted in substantially the same manner as those of FIG. 6 in which the "first transmission packet" is replaced with the "fourth packet", and the "storing unit" and the "first reply packet" are deleted.

Upon completion of execution of the RG setting transmission command in step S510, the communication controller 30 performs the above communication monitoring process (see FIG. 7), so as to determine whether the fourth packet has been normally received (steps S520, S530). By performing the communication monitoring process, the communication controller 30 can determine whether the fourth packet has been normally received, and the reliability in communications between the microcomputer 22 and the communication controller 30 can be improved.

When the communication controller 30 determines in steps S520, S530 that the fourth packet has been normally received, the storing unit 33 stores the reject information RGi[1] to RGi[12] included in the fourth packet (step S540). On the other hand, when the communication controller 30 determines that the fourth packet has not been normally received, it carries out the RG default return process as described above (step S550).

Upon completion of execution of the RG setting transmission command in step S510, the microcomputer 22 creates a fifth packet, to thus prepare an RO setting reflection command (step S560), and the microcomputer 22 and the communication controller 30 execute the RG setting reflection command (step S570). According to the RG setting reflection command of this routine, the microcomputer 22 sends the fifth packet to the communication controller 30, and the receiving unit 31 of the communication controller 30 receives and latches the fifth packet. As shown in FIG. 23, the fifth packet has 15 bits (bit0-bit14), and is the same packet as the second transmission packet (see FIG. 9 and FIG. 10). Also, communications between the microcomputer 22 and the communication controller 30 according to the RG setting reflection command of this routine are conducted in substantially the same manner as those of FIG. 6 in which the "first transmission packet" is replaced with the "fifth packet", and the "storing unit" and the "first reply packet" are deleted.

Upon completion of execution of the RG setting reflection command in step S570, the communication controller 30 performs the above communication monitoring process (see FIG. 7), to thus determine whether the fifth packet has been normally received (steps S580, S590). With the communication monitoring process thus executed, the communication controller 30 can determine whether the fifth packet has been normally received, and the reliability in communications between the microcomputer 22 and the communication controller 30 can be improved.

When the communication controller 30 determines in steps S580, S590 that the fifth packet has been normally received, the reflecting unit 34 reflects the reject information RGi[1] to RGi[12] stored in step S540 or step S550, in the reject signals RG[1] to RG[12] (step S600). On the other hand, when the communication controller 30 determines that the fifth packet has not been normally received, it carries out the RG default return process as described above (step S610).

Upon completion of execution of the RG setting reflection command in step S570, the microcomputer 22 creates a sixth packet, to thus prepare an RG setting check command (step S620). The microcomputer 22 and the communication controller 30 execute the RG setting check command (step S630). According to the RG setting check command, the microcomputer 22 sends the sixth packet to the communication controller 30, and the receiving unit 31 of the communication controller 30 receives and latches the sixth packet.

As shown in FIG. 23, the sixth packet has 15 bits (bit0-bit14), and will be more specifically described. The bit0 and bit1 mean a start bit and a command bit (meaning the RG setting check command) as a combination, and both of the bit0 and bit1 are set to value 0 in the second embodiment. The bit2 to bit13 are bits of reversal values of the reject information RGi[1] to RGi[12]. The bit14 is a parity bit. Also, communications between the microcomputer 22 and the communication controller 30 according to the RG setting check command of this routine are conducted in substantially the same manner as those of FIG. 6 in which the "first transmission packet" is replaced with the "sixth packet", and the "storing unit" and "first reply packet" are deleted.

Upon completion of execution of the RG setting check command in step S630, the communication controller 30 performs the above communication monitoring process (see FIG. 7), to thus determine whether the sixth packet has been normally received (steps S640, S650). FIG. 24 shows one example of the content of the communication monitoring process in this case. The content of the communication monitoring process of FIG. 24 is identical with the content of the communication monitoring process of FIG. 7, except that the content of packet data monitoring is changed (the content of abnormality determination with the RG setting check command is added). As shown in FIG. 24, in the packet data monitoring of this case, each time one packet is received, data bits are monitored, and, immediately after completion of execution of the RG setting check command, stored values (the reject information RGi[1] to RGi[12] stored in the storing unit 33, basically, the reject information RGi[1] to RGi[12] stored in step S540) are compared with latched values (the reject information RGi[1] to RGi[12] latched by the receiving unit 31 according to the RG setting check command), with respect to bit2 to bit13. When all of the stored values of the bit2 to bit13 do not coincide with the latched values of these bits, the communication controller 30 determines that the sixth packet has been normally received. When the stored value of at least one of the bit2 to bit13 coincides with the corresponding latched value(s) thereof, the communication controller 30 determines that the sixth packet has not been normally received. By executing the communication monitoring process, the communication controller 30 can determine whether the sixth packet has been normally received, and the reliability in communications between the microcomputer 22 and the communication controller 30 can be improved.

When the communication controller 30 determines in steps S640, S650 that the sixth packet has been normally received, it prepares an OK flag (step S660). On the other hand, when the communication controller 30 determines that the sixth packet has not been normally received, it carries out the above RG default return process (step S670), and prepares an NG flag (step S680).

Then, the communication controller 30 outputs the OK flag or NG flag to the microcomputer 22 via the signal line 125 (step S690), and proceeds to the above step S270. In the second embodiment, the OK flag is generated by setting the voltage level of the signal line 125 to a high level, and the NO flag is generated by setting the voltage level of the signal line 125 to a low level. Also, during a period from the time when the system is started, to the time when step S690 is executed for the first time, the OK flag is generated by setting the voltage level of the signal line 125 to the high level.

The microcomputer 22 determines whether the flag received from the communication controller 30 is the OK flag or NG flag (step S700). When the flag is the OK flag, the microcomputer 22 proceeds to step S310. On the other hand, when the flag is the NG flag, the microcomputer 22 proceeds to step S320. With step S700 thus executed, the microcomputer 22 can determine whether the reject information RGi[1] to RGi[12] was normally reflected by the reject signals RG[1] to RG[12], and the reliability in communications between the microcomputer 22 and the communication controller 30 can be improved.

The microcomputer 22 and the communication controller 30 repeatedly execute the RG setting transmission command, RG setting reflection command, and RG setting check command, in this order, so that the reject information RGi[1] to RGi[12] is transmitted from the microcomputer 22 to the communication controller 30, and the communication controller 30 reflects the reject information RGi[1] to RGi[12] in the reject signals RG[1] to RG[12], as in the first embodiment. Then, the shutdown unit 40 sets the protection control signal to the drive permission command or shutdown command, based on the fail signals FAIL[1] to FAIL[12] from the power conversion circuitry 12, and the reject signals RG[1] to RG[12] from the communication controller 30.

FIG. 25 shows one example of the operations of the power conversion circuitry 12 and the electronic control unit 120 of the second embodiment. In FIG. 25, the operations prior to time t22 are identical with those prior to time t2 in FIG. 13. As shown in FIG. 25, when the microcomputer 22 determines that it rejects any fail signal from the power conversion circuitry 12 (time t22), the microcomputer 22 and the communication controller 30 execute the RG setting transmission command (transmission of the fourth packet), and the communication controller 30 stores the reject information included in the fourth packet. Also, the microcomputer 22 and the communication controller 30 execute the RG setting reflection command (transmission of the fifth packet), and the communication controller 30 reflects the reject information in the reject signals. Then, the reject circuit 42 rejects the fail signal, the protection control signal from the determination circuit 44 becomes the drive permission command, and the microcomputer 22 resumes drive control of the power conversion circuitry 12. Then, the microcomputer 22 and the communication controller 30 execute the RG setting check command (transmission of the sixth packet), and the communication controller 30 outputs the OK flag or NG flag to the microcomputer 22.

The electronic control unit 120 of the second embodiment as described above includes the microcomputer 22, communication controller 30, and shutdown unit 40, and the communication controller 30 and the shutdown unit 40 are formed on the ASIC (one chip), as in the first embodiment. The power conversion circuitry 12 and the shutdown unit 40 are connected via "n" pieces (the number of types of failures in the power conversion circuitry 12) of signal lines 18, and the communication controller 30 and the shutdown unit 40 are connected via "n" pieces of signal lines 38, while the microcomputer 22 and the communication controller 30 are connected via four wires (three communication lines 124 and one signal line 125), which are smaller in number than the "n" pieces. With this arrangement, the total number of the communication lines 124 and signal line 125 which connect the microcomputer 22 with the communication controller 30 can be made relatively small, and the number of the communication lines 124 and signal line 125 is less likely or unlikely to increase when the number (the number of types of failures in the power conversion circuitry 12) of the signal lines 18 is increased. Thus, the failure rate is less likely or unlikely to be increased. Also, since the number of the signal lines 18 for the fail signals FAIL[1] to FAIL[n] is equal to the number of the signal lines 38 for the reject signals RG[1] to RG[n], two or more fail signals FAIL[1] to FAIL[n] are prevented from being rejected, when an abnormality occurs to one of the signal lines 38 (which is fixed to a high-level signal, for example).

In the electronic control unit 120 of the second embodiment, upon completion of execution of the RG setting transmission command, RG setting reflection command, or RG setting check command, the communication controller 30 performs the communication monitoring process, to thus determine whether the fourth packet, fifth packet, or sixth packet has been normally received. Also, upon completion of execution of the RG setting check command, the communication controller 30 performs the communication monitoring process, so as to output the OK flag or NG flag to the microcomputer 22, and the microcomputer 22 determines whether the flag received from the communication controller 30 is OK flag or NG flag. With these arrangements, the reliability in communications between the microcomputer 22 and the communication controller 30 can be improved.

In the electronic control unit 120 of the second embodiment, when execution of the RG setting check command is completed, and the communication controller 30 performs the communication monitoring process, data bits of each packet are monitored by comparing stored values (values stored by the storing unit 33, basically, values stored in step S540) with latched values (values latched by the receiving unit 31 according to the RG setting check command), with respect to bit2 to bit13, as shown in FIG. 24. When all of the stored values of the bit2 to bit13 do not coincide with the corresponding latched values, the communication controller 30 determines that the packet data is normal. When the stored value of at least one of the bit2 to bit13 coincides with the corresponding latched value(s), the communication controller 30 determines that the packet data is abnormal. However, with respect to the bit2 to bit13, values (value 1 when the reject signal is a high-level signal, value 0 when it is a low-level signal) corresponding to the reflection results of the reject signals RG[1] to RG[12] may be compared with the stored values, and the communication controller 30 may determine that the packet data is normal when the values corresponding to the reflection results with respect to all of the bit2 to bit13 coincide with the stored values, while the communication controller 30 may determine that the packet data is abnormal when the value corresponding to the reflection result with respect to at least one of the bit2 to bit13 does not coincide with the stored value. Also, with respect to the bit2 to bit13, values corresponding to the reflection results of the reject signals RG[1] to RG[12] may be compared with the latched values, and the communication controller 30 may determine that the packet data is normal when the values corresponding to the reflection results with respect to all of the bit2 to bit13 coincide with the corresponding latched values, while it may determine that the packet data is abnormal when the value corresponding to the reflection result with respect to at least one of the bit2 to bit13 does not coincide with the corresponding latched value.

In the electronic control unit 120 of the second embodiment, the communication controller 30 performs the communication monitoring process, when execution of the RG setting transmission command, RG setting reflection command, and RG setting check command is completed. However, the communication monitoring process may not be performed. Also, in the second embodiment, the communication controller 30 performs the communication monitoring process upon completion of execution of the RG setting check command, and outputs the OK flag or NG flag to the microcomputer 22. However, the communication controller 30 may not output the OK flag or NG flag to the microcomputer 22.

Figure 26:
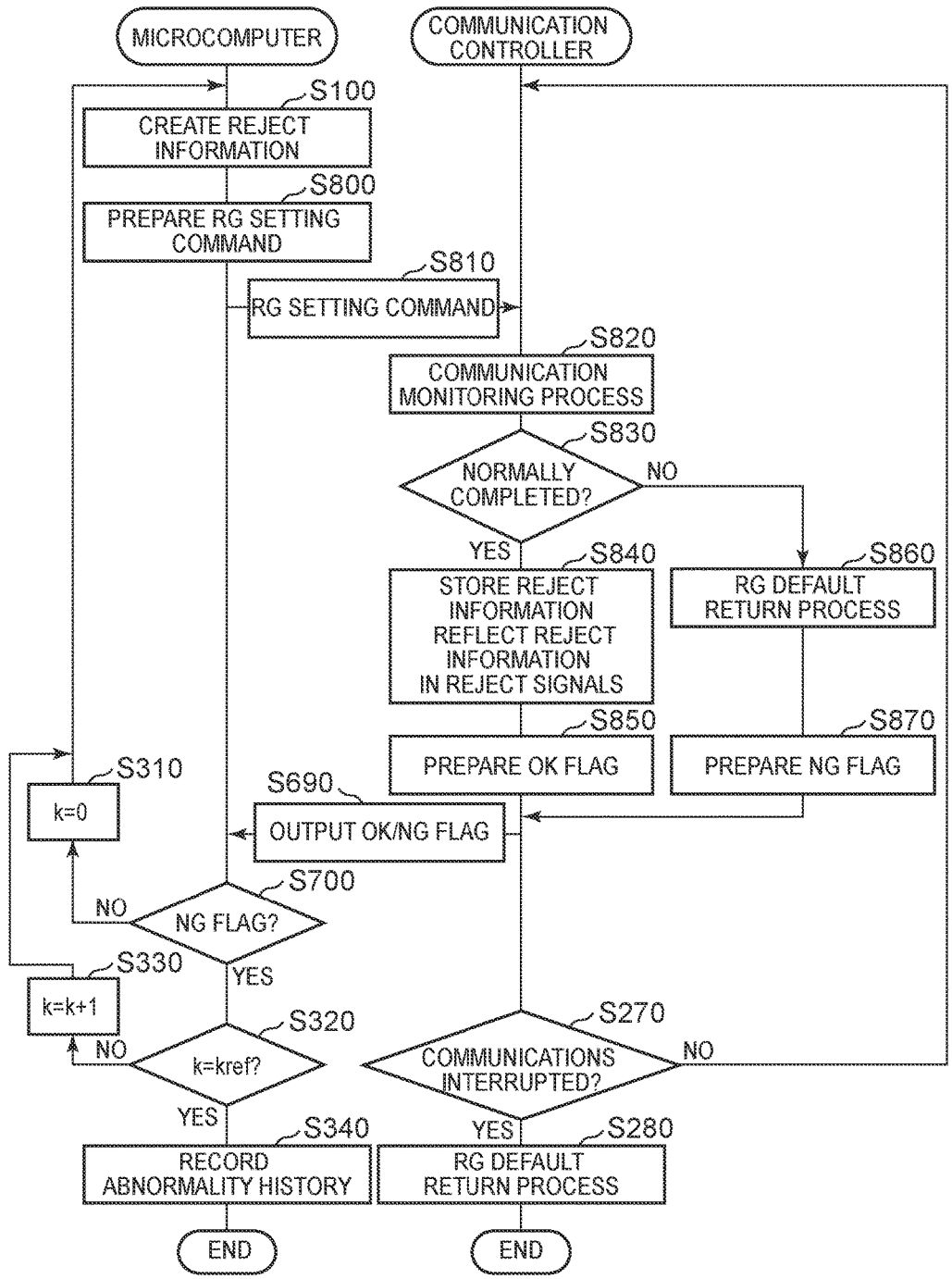
FIG. 26 is a flowchart illustrating one example of a control routine of the microcomputer and communication controller of a modified example.

In the electronic control unit 120 of the second embodiment, the control routine of the microcomputer 22 and communication controller 30 as shown in FIG. 22 is executed. Instead of this routine, a control routine of the microcomputer 22 and communication controller 30 as shown in FIG. 26 may be executed. The control routine of FIG. 26 is identical with that of FIG. 22, except that steps S800 to S870 are executed, in place of steps S500 to S680. Thus, the same step numbers are assigned to the same operations, of which detailed description will not be provided.

In the control routine of FIG. 26, the microcomputer 22 creates the reject information RGi[1] to RGi[12] in step S100, and creates a seventh packet including the reject information RGi[1] to RGi[12], to thus prepare an RG setting command (step S800). Then, the microcomputer 22 and the communication controller 30 execute the RG setting command (step S810). According to the RG setting command of this routine, the microcomputer 22 sends the seventh packet to the communication controller 30, and the receiving unit 31 of the communication controller 30 receives and latches the seventh packet. The seventh packet is the same packet as the above first packet (see FIG. 4 and FIG. 5). Also, communications between the microcomputer 22 and the communication controller 30 according to the RG setting command of this routine are conducted in the same manner as those of FIG. 6 in which the "first transmission packet" is replaced with the "seventh packet", and the "storing unit" and the "first reply packet" are deleted.

Upon completion of execution of the RG setting command in step S810, the communication controller 30 performs the above communication monitoring process (see FIG. 7), so as to determine whether the seventh packet has been normally received (steps S820, S830). In this case, the packet data monitoring in the communication monitoring process is performed in the same manner as that performed immediately after completion of execution of the RG setting transmission command. By performing the communication monitoring process, the communication controller 30 can determine whether the seventh packet has been normally received, and the reliability in communications between the microcomputer 22 and the communication controller 30 can be improved.

When the communication controller 30 determines in steps S820, S830 that the seventh packet has been normally received, the storing unit 33 stores the reject information RGi[1] to RGi[12] included in the seventh packet, and the reflecting unit 34 reflects the reject information RGi[1] to RGi[12] in the reject signals RG[1] to RG[12] (step S840), so as to prepare the OK flag (step S850). On the other hand, when the communication controller 30 determines that the seventh packet has not been normally received, it performs the above RG default return process (step S860), to prepare the NG flag (step S870).

Then, the communication controller 30 outputs the OK flag or NG flag to the microcomputer 22 via the signal line 125 (step S690), and proceeds to the above step S270. Also, the microcomputer 22 receives the flag from the communication controller 30, and proceeds to step S700.

The microcomputer 22 and the communication controller 30 repeatedly execute the RG setting command, so that the reject information RGi[1] to RGi[12] is transmitted from the microcomputer 22 to the communication controller 30, and the communication controller 30 reflects the reject information RGi[1] to RGi[12] in the reject signals RG[1] to RG[12], as in the first embodiment. Then, the shutdown unit 40 sets the protection control signal to the drive permission command or shutdown command, based on the fail signals FAIL[1] to FAIL[12] from the power conversion circuitry 12, and the reject signals RG[1] to RG[12] from the communication controller 30.

Figure 27:
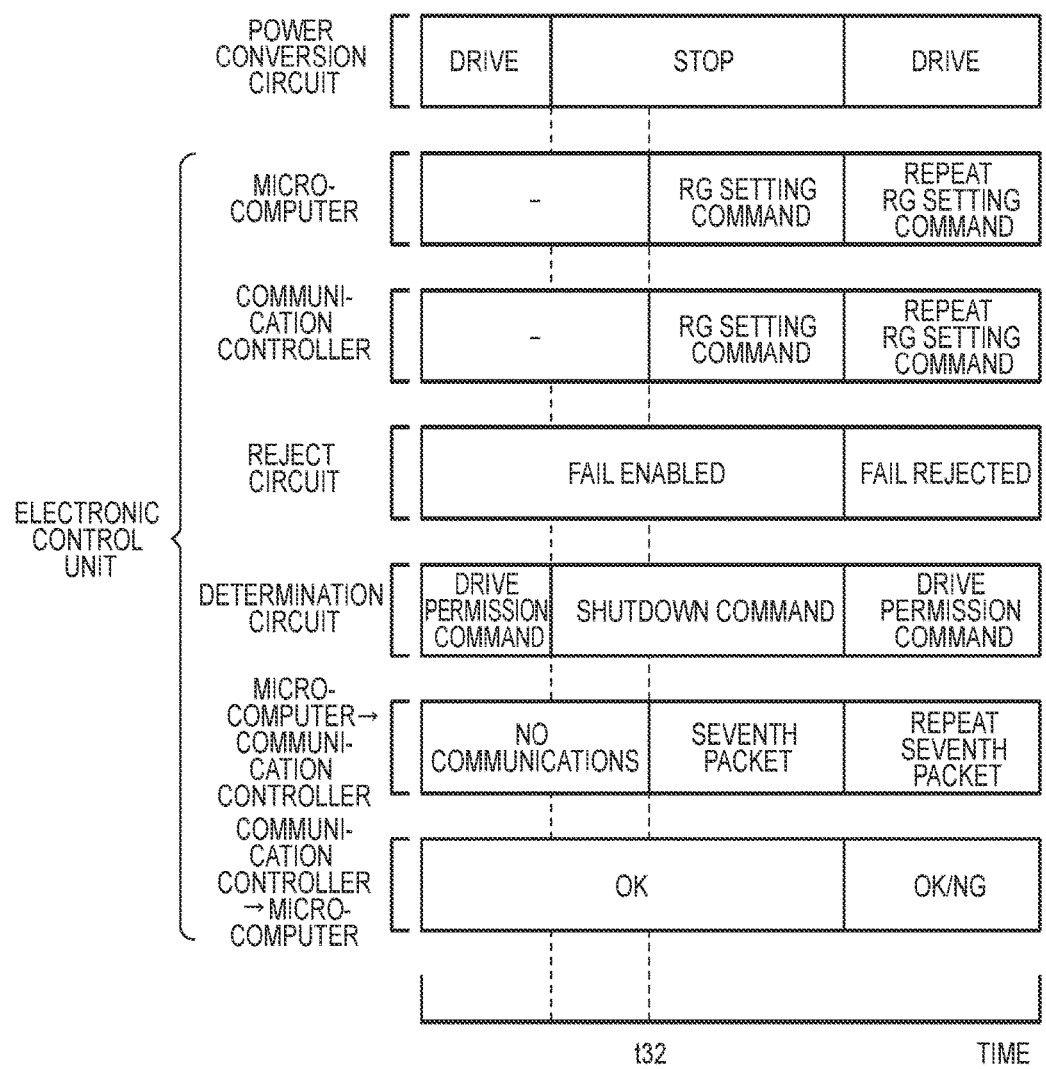
FIG. 27 is an explanatory view showing one example of the operations of the power conversion circuitry and electronic control unit of the modified example.

FIG. 27 shows one example of the operations of the power conversion circuitry 12 and the electronic control unit 120 of this modified example. In FIG. 27, the operations prior to time t32 are identical with those prior to time t2 in FIG. 13. As shown in FIG. 27, when the microcomputer 22 determines that it rejects any fail signal from the power conversion circuitry 12 (time t32), the microcomputer 22 and the communication controller 30 execute the RG setting command (transmission of the seventh packet), and the communication controller 30 stores the reject information included in the seventh packet, and reflects the reject information in the reject signals. Then, the reject circuit 42 rejects the fail signal, and the protection control signal from the determination circuit 44 becomes the drive permission command, so that drive control of the power conversion circuitry 12 by the microcomputer 22 is resumed. Then, the communication controller 30 outputs the OK flag or NG flag to the microcomputer 22.

In the electronic control unit 120 of the modified example, the communication controller 30 performs the communication monitoring process, upon completion of execution of the RG setting command. However, the communication monitoring process may not be performed. Also, in the modified example, upon completion of execution of the RG setting command, the communication controller 30 performs the communication monitoring process, and outputs the OK flag or NG flag to the microcomputer 22. However, the OK flag or NG flag may not be delivered to the microcomputer 22.

Figure 28:
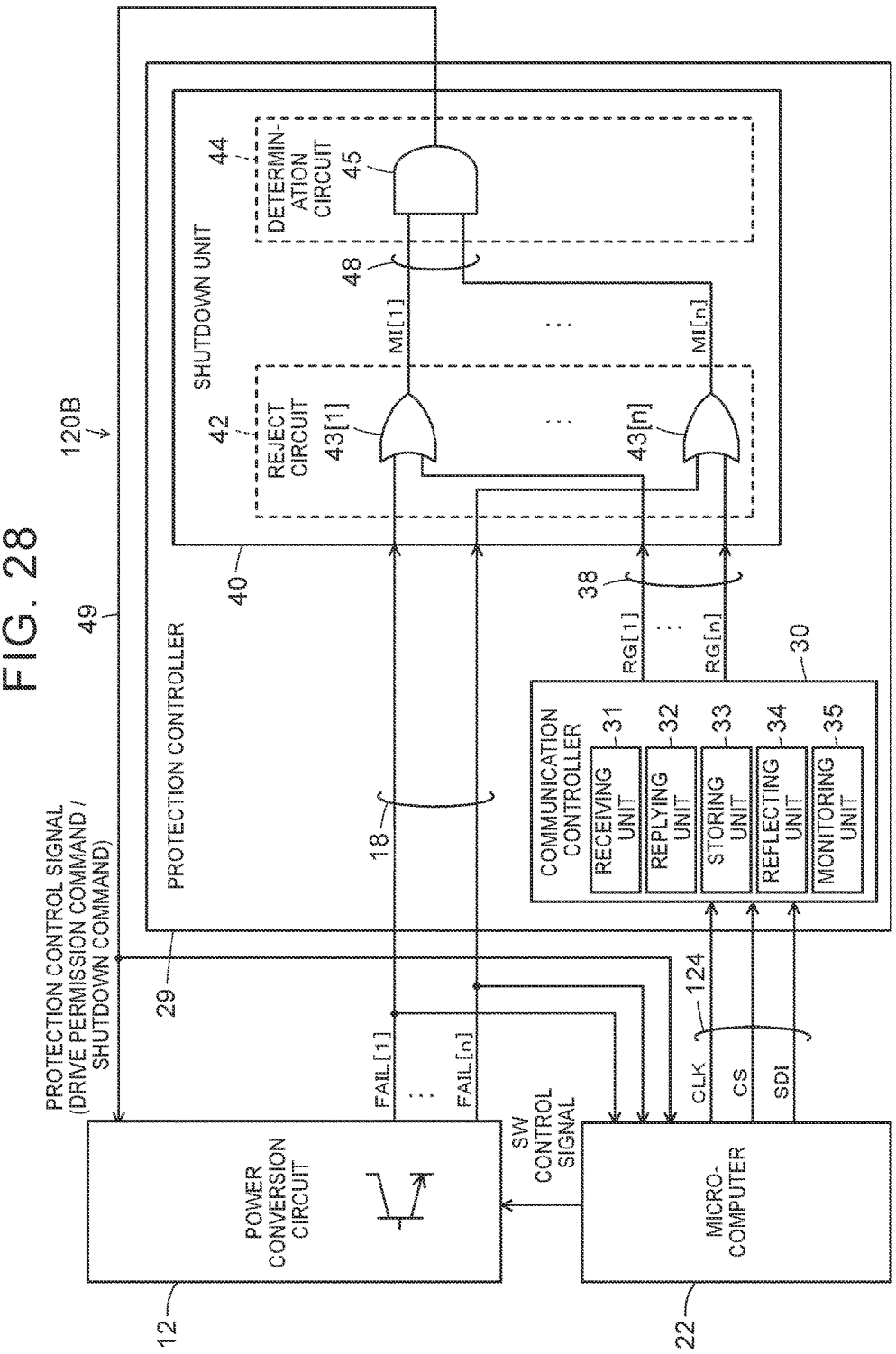
FIG. 28 is a view schematically showing the configuration of an electronic control unit of a modified example.

In the electronic control unit 120 of the second embodiment, the microcomputer 22 and the communication controller 30 are connected via three communication lines (CS, CLK, SDI) 124 and one signal line 125. However, in an electronic control unit 120B of a modified example as shown in FIG. 28, the microcomputer 22 and the communication controller 30 may be connected via three communication lines (CS, CLK, SDI) 124, and the microcomputer 22 may be configured to monitor the protection control signal of the signal line 49.

Figure 29:
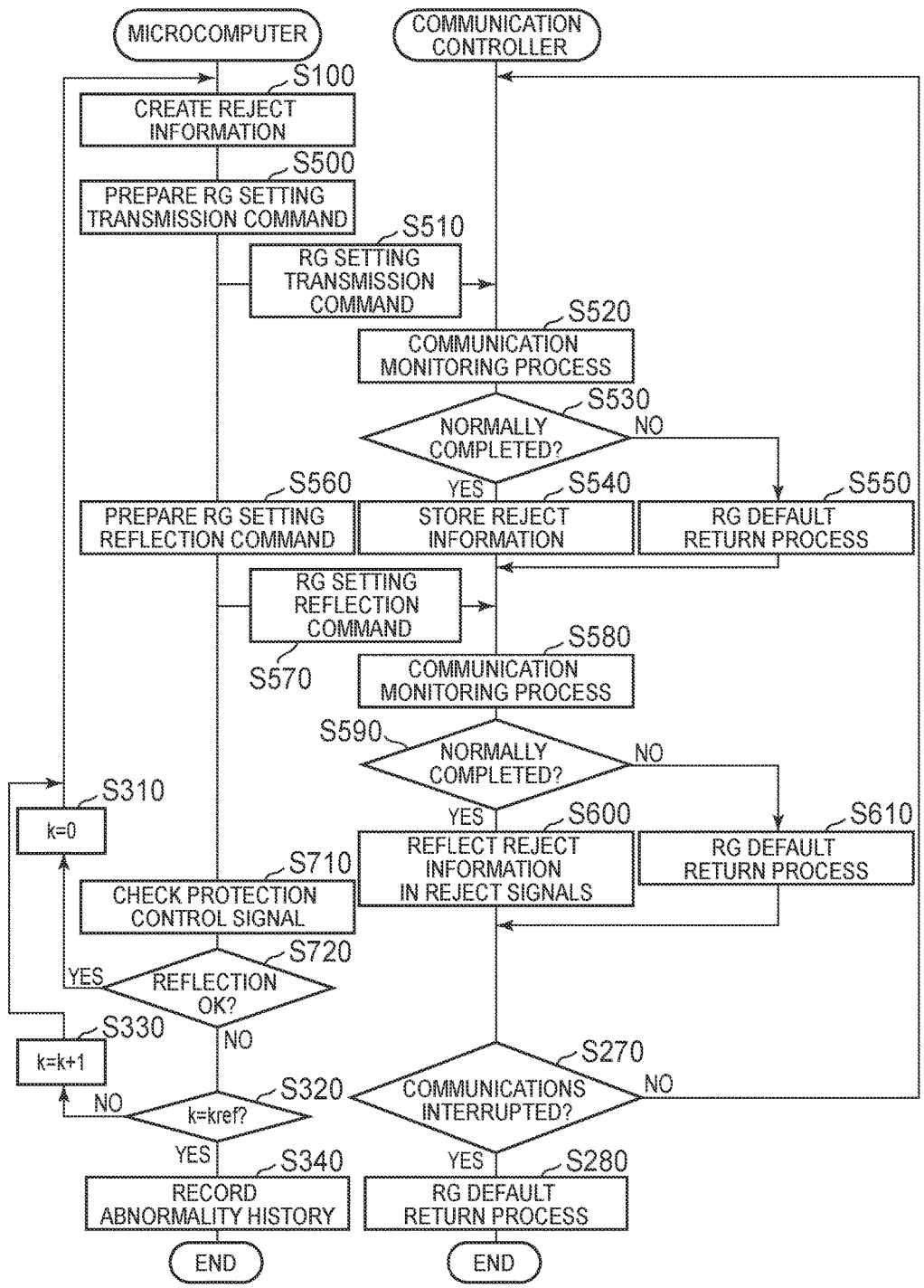
FIG. 29 is a flowchart illustrating one example of a control routine of the microcomputer and communication controller of the modified example.

In this case, a control routine of the microcomputer 22 and communication controller 30 as shown in FIG. 29 is executed, in place of the control routine of the microcomputer 22 and communication controller 30 as shown in FIG. 22. The control routine of FIG. 29 is identical with that of FIG. 22, except that steps S710, S720 are executed, in place of steps S630 to S700. Thus, the same step numbers are assigned to the same operations, of which detailed description will not be provided.

In the control routine of FIG. 29, when a predetermined time T11 elapses from completion of execution of the RG setting reflection command in step S560, the microcomputer 22 checks the protection control signal of the signal line 49 (step S710), and determines whether the protection control signal is the drive permission command or shutdown command, so as to determine whether the reject information RGi[1] to RGi[12] was normally reflected by the reject signals RG[1] to RG[12] (step S720).

The predetermined time T11 is determined as a length of time which is required for the reject signals RG[1] to RG[12] to reflect the reject information RGi[1] to RGi[12] after completion of execution of the RG setting reflection command, and is shorter to some extent than the predetermined time Tint used for packet interval monitoring. With this step S720, too, the microcomputer 22 can determine whether the reject information RGi[1] to RGi[12] was normally reflected by the reject signals RG[1] to RG[12], as in the above step S700, and the reliability in communications between the microcomputer 22 and the communication controller 30 can be improved.

When the microcomputer 22 determines in step S720 that the reject information RGi[1] to RGi[12] was normally reflected by the reject signals RG[1] to RG[12], it proceeds to the above step S310. On the other hand, when the microcomputer 22 determines that the reject information RGi[1] to RGi[12] was not normally reflected by the reject signals RG[1] to RG[12], it proceeds to the above step S320.

Figure 30:
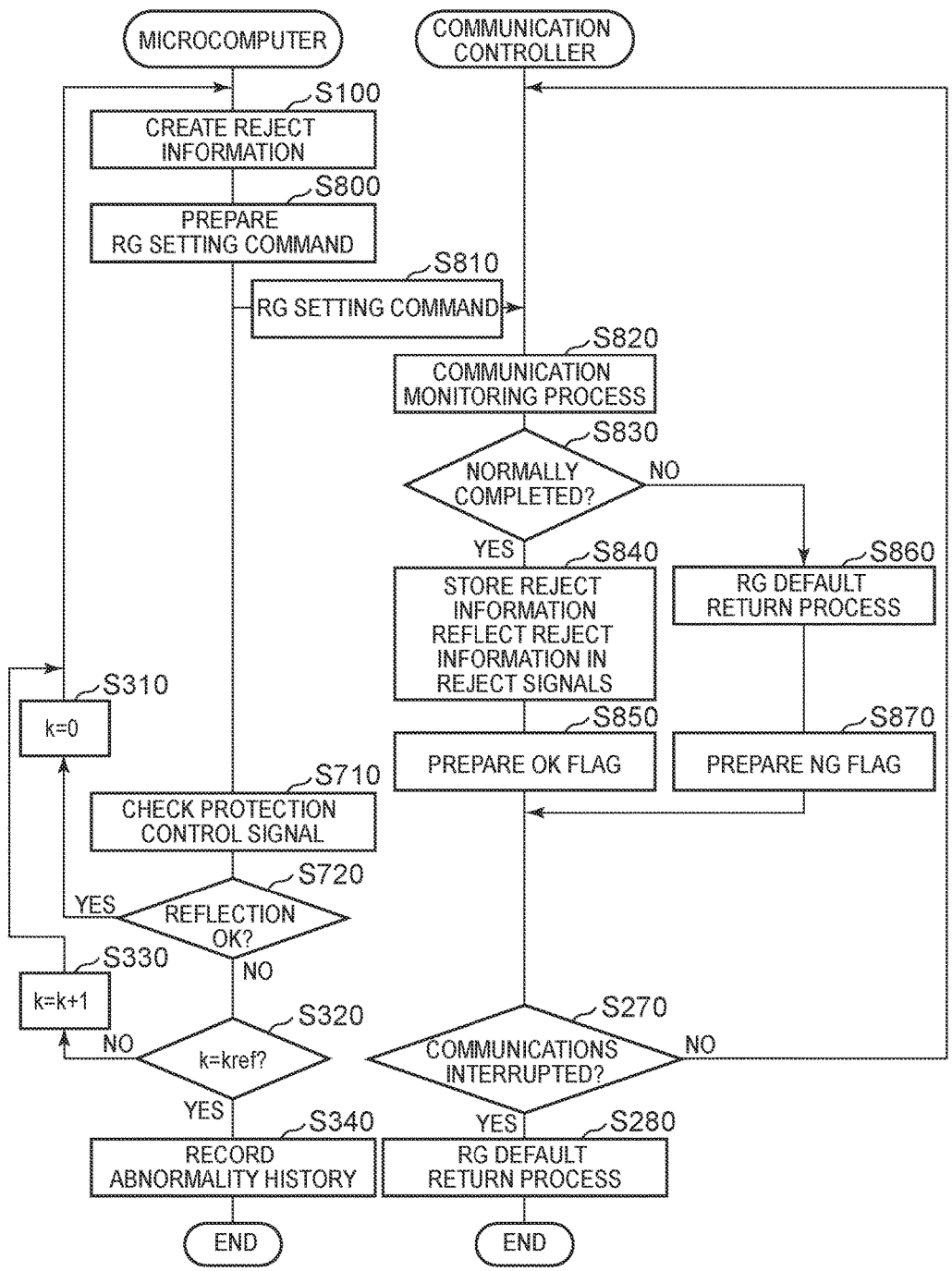
FIG. 30 is a flowchart illustrating another example of a control routine of the microcomputer and communication controller of the modified example.

In the electronic control unit 120B of this modified example, the microcomputer 22 and the communication controller 30 perform the control routine of FIG. 29 in which steps S710, S720 are executed, in place of steps S620 to S700 of the control routine of the microcomputer 22 and communication controller 30 as shown in FIG. 22. However, the microcomputer 22 and the communication controller 30 may perform a control routine of FIG. 30 in which steps S710, S720 are executed, in place of steps S690, S700 of the control routine of the microcomputer 22 and communication controller 30 as shown in FIG. 26. The operations of steps S710, S720 in the control routine of FIG. 30 are identical with the operations of steps S710, S720 in the control routine of FIG. 29.

In the above-mentioned electronic control unit 120B of the modified example, the communication controller 30 performs the communication monitoring process upon completion of execution of the RG setting command. However, the communication monitoring process may not be performed.

Third Embodiment

Figure 31:
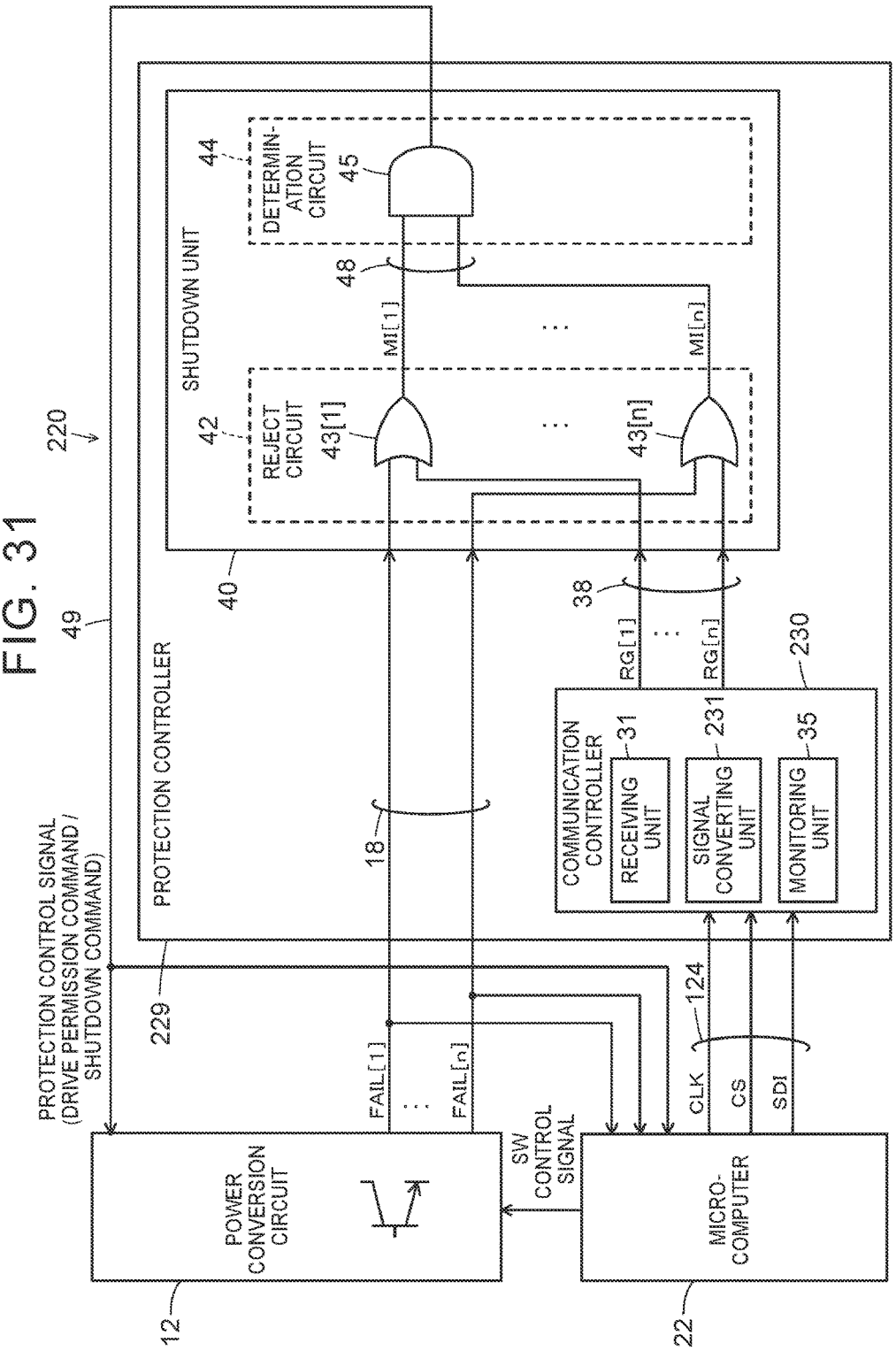
FIG. 31 is a view schematically showing the configuration of an electronic control unit of a third embodiment.

Next, an electronic control unit 220 according to a third embodiment of the disclosure will be described. FIG. 31 schematically shows the configuration of the electronic control unit 220 of the third embodiment. The electronic control unit 220 of the third embodiment is identical with the electronic control unit 120B of FIG. 28, except that the communication controller 30 is replaced with a communication controller 230 (the protection controller 29 is replaced with a protection controller 229). Thus, in order to avoid repeated description, the same reference numerals are assigned to the same constituent elements as those of the electronic control unit 120B, and detailed description of these elements will not be provided. In the electronic control unit 220, the microcomputer 22 does not receive any packet from the communication controller 230, as in the electronic control unit 120 of the second embodiment. With this arrangement, the resource of the microcomputer 22 for communications can be reduced, resulting in reduction of the cost of the microcomputer 22, and increase in choices of the microcomputer 22. On the other hand, when an abnormality occurs to communications between the microcomputer 22 and the communication controller 230, it is impossible to specify the bit of the packet to which the abnormality occurred, as in the electronic control unit 20 of the first embodiment.

The protection controller 229 is configured as a module, by integrally molding the communication controller 230 and the shutdown unit 40 with resin. The communication controller 230 is provided by a general-purpose product or a combination thereof, and includes receiving unit 31 and monitoring unit 35 similar to those of the communication controller 30, and a signal converting unit 231 that converts serial values of communication data into parallel values, as functional blocks. Since the communication controller 230 is provided by a general-purpose product or a combination thereof, the cost of development can be reduced. On the other hand, since the communication controller 230 and the shutdown unit 40 cannot be formed on the ASIC (one chip), it is necessary to form the communication controller 230 as another IC, and mold it with the shutdown unit 40 with resin, for example, to provide a module, so as to curb increase of the failure rate.

Figure 32:
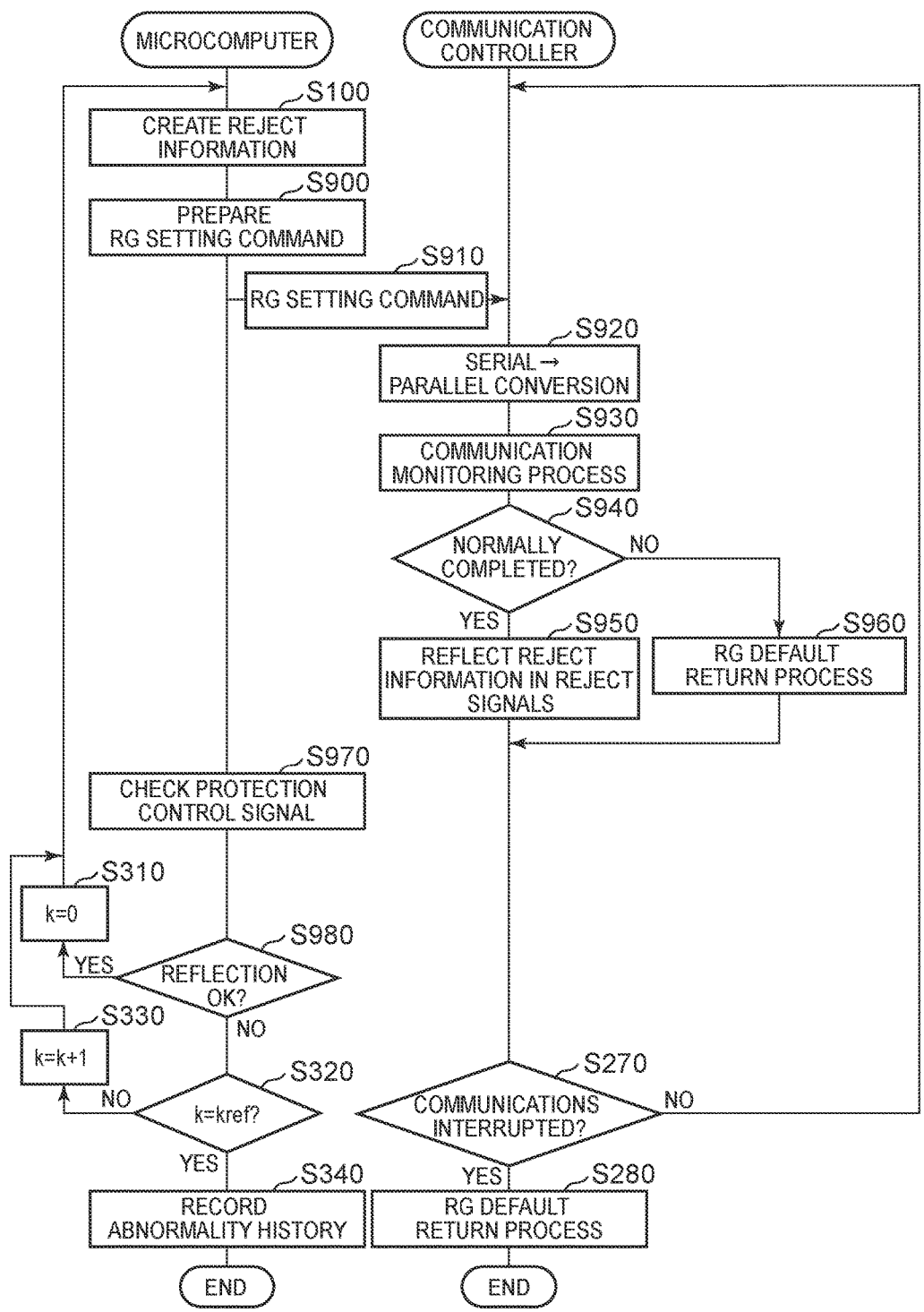
FIG. 32 is a flowchart illustrating one example of a control routine of the microcomputer and communication controller of the third embodiment.

In the electronic control unit 220, a control routine of the microcomputer 22 and communication controller 230 as shown in FIG. 32 is executed. The control routine of FIG. 32 is identical with that of FIG. 3, except that steps S900 to S980 are executed, in place of steps S110 to S210, S290, and S300. Thus, the same step numbers are assigned to the same operations, of which detailed description will not be provided. In the third embodiment, too, value "n" representing the number of types of failures in the power conversion circuitry 12 is equal to 12, as in the first embodiment.

In the control routine of FIG. 32, the microcomputer 22 creates reject information RGi[1] to RGi[12] in step S100, and creates an eighth packet including the reject information RGi[1] to RGi[12], to thus prepare an RG setting command (step S900). Then, the microcomputer 22 and the communication controller 230 execute the RG setting command (step S910). According to the RG setting command of this routine, the microcomputer 22 sends the eighth packet to the communication controller 230, and the receiving unit 31 of the communication controller 230 receives and latches the eighth packet. The eighth packet is the same packet as the above first transmission packet (see FIG. 4 and FIG. 5). The communications between the microcomputer 22 and the communication controller 230 according to the RG setting command of this routine are performed in the same manner as those of FIG. 6 in which the "first transmission packet" is replaced with the "eighth packet", and the "storing unit" and "first reply packet" are deleted.

Upon completion of execution of the RG setting command in step S910, the signal converting unit 231 of the communication controller 230 converts the reject information RGi[1] to RGi[12] in the form of serial values included in the eighth packet, into reject information RGi[1] to RGi[12] in the form of parallel values (step S920).

Then, the communication controller 230 performs the communication monitoring process (see FIG. 7) so as to determine whether the eighth packet has been normally received (steps S930, S940). In this case, packet data monitoring in the communication monitoring process is performed in the same manner as that performed immediately after completion of execution of the RG setting transmission command. With the communication monitoring process thus performed, the communication controller 230 can determine whether the eighth packet has been normally received, and the reliability in communications between the microcomputer 22 and the communication controller 230 can be improved.

When the communication controller 230 determines in steps S930, S940 that the eighth packet has been normally received, the signal converting unit 231 reflects the reject information RGi[1] to RGi[12] represented by parallel values, in reject signals RG[1] to RG[12] (step S950). On the other hand, when the communication controller 230 determines that the eighth packet has not been normally received, the above RG default return process is carried out (step S960).

When a predetermined time T21 elapses from completion of execution of the RG setting command in step S910, the microcomputer 22 checks the protection control signal of the signal line 49 (step S970), and determines whether the protection control signal is the drive permission command or shutdown command, so as to determine whether the reject information RGi[1*l*] to RGi[12] was normally reflected by the reject signals RG[1] to RG[12](step S980). Here, substantially the same length of time as the above predetermined time T11 is used as the predetermined time T21.

When the microcomputer 22 determines in step S980 that the reject information RGi[1] to RGi[12] was normally reflected by the reject signals RG[1] to RG[12], it proceeds to step S310. On the other hand, when the microcomputer 22 determines that the reject information RGi[1] to RGi[12] was not normally reflected by the reject signals RG[1] to RG[12], it proceeds to the above step S320.

Figure 33:
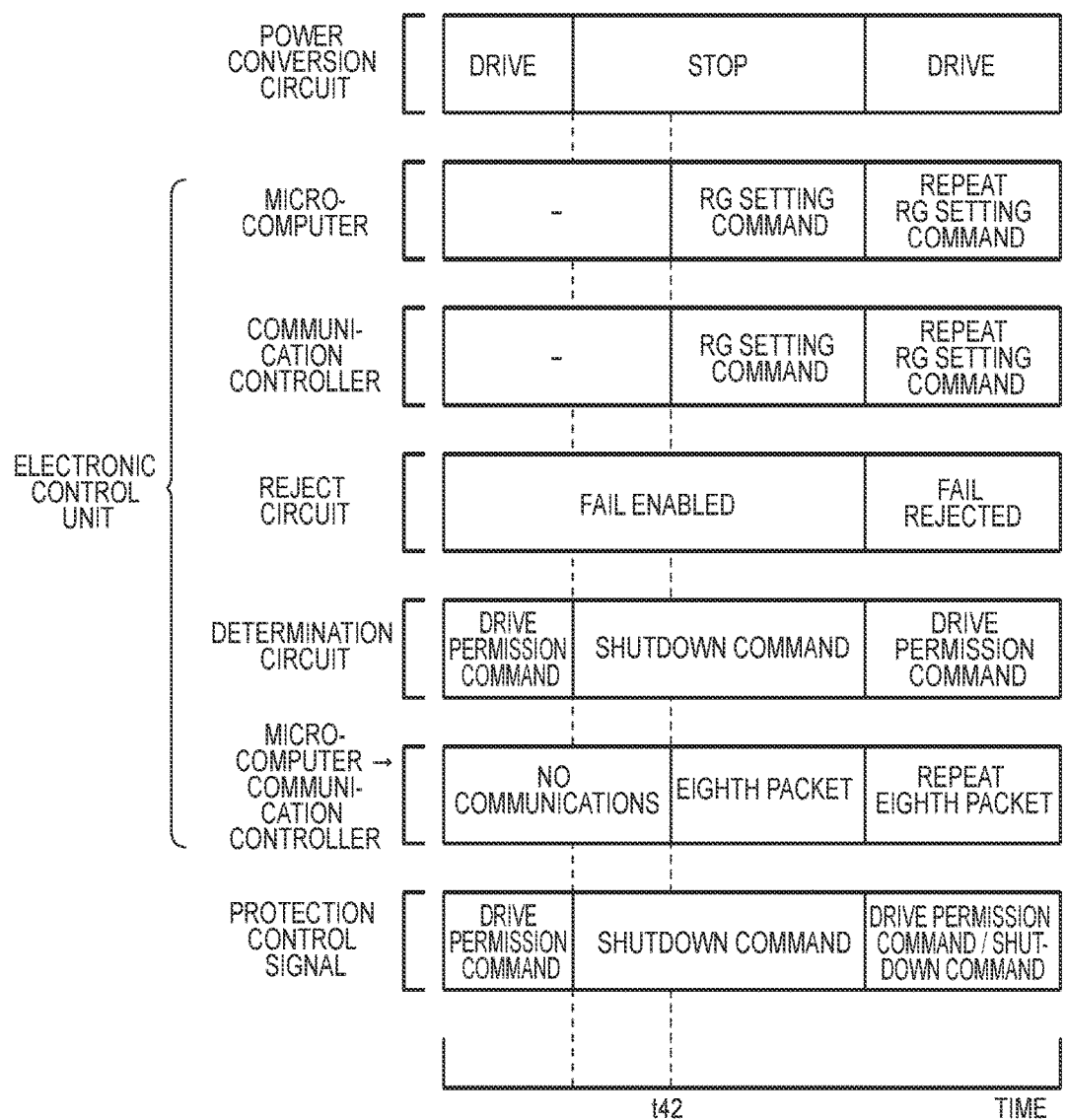
FIG. 33 is an explanatory view showing one example of the operations of the power conversion circuitry and electronic control unit of the third embodiment.

FIG. 33 shows one example of the operations of the power conversion circuitry 12 and electronic control unit 220 of the third embodiment. In FIG. 33, the operations prior to time t42 are the same as those prior to time t2 of FIG. 13. As shown in FIG. 33, when the microcomputer 22 determines that it rejects any fail signal from the power conversion circuitry 12 (time t42), the microcomputer 22 and the communication controller 230 execute the RG setting command (transmission of the eighth packet), and the communication controller 230 converts the reject information included in the eighth packet from serial values into parallel values, and reflects the parallel values in the reject signals. Then, the reject circuit 42 rejects the fail signal, and the protection control signal from the determination circuit 44 becomes the drive permission command, so that drive control of the power conversion circuitry 12 by the microcomputer 22 is resumed. Then, the microcomputer 22 repeatedly executes the RG setting command, while checking the protection control signal.

The electronic control unit 220 of the third embodiment as described above includes the microcomputer 22, communication controller 230, and shutdown unit 40, and the communication controller 230 and the shutdown unit 40 are configured as a module, as in the first embodiment. Then, the power conversion circuitry 12 and the shutdown unit 40 are connected via the "n" pieces (equal to the number of types of failures in the power conversion circuitry 12) of signal lines 18, and the communication controller 230 and the shutdown unit 40 are connected via the "n" pieces of signal lines 38, while the microcomputer 22 and the communication controller 230 are connected via three communication lines 124. Thus, the number of the communication lines 124 that connect the microcomputer 22 with the communication controller 230 can be made relatively small, and the number of the communication lines 124 is less likely or unlikely to be increased when the number of the signal lines 18 (the number of types of failures in the power conversion circuitry 12) is increased; therefore, the failure rate is less likely or unlikely to be increased. Also, since the number of the signal lines 18 for the fail signals FAIL[1] to FAIL[n] is equal to the number of the signal lines 38 for the reject signals RG[1] to RG[n], two or more fail signals FAIL[1] to FAIL[n] are prevented from being rejected when an abnormality occurs to one of the signal lines 38 (which is fixed to a high-level signal, for example).

In the electronic control unit 220 of the third embodiment, upon completion of execution of the RG setting command, the communication controller 230 performs the communication monitoring process, to determine whether the eighth packet has been normally received. Also, the microcomputer 22 monitors the protection control signal of the signal line 49. With these arrangements, the reliability in communications between the microcomputer 22 and the communication controller 230 can be improved.

In the electronic control unit 220 of the third embodiment, the communication controller 230 performs the communication monitoring process, upon completion of execution of the RG setting command. However, the communication monitoring process may not be performed.

In the electronic control unit 220 of the third embodiment, the microcomputer 22 monitors the protection control signal of the signal line 49. However, the protection control signal of the signal line 49 may not be monitored.

In the first through third embodiments, when the number of times of retry "k" is equal to the threshold value kref, an abnormality in communications between the microcomputer 22 and the communication controller 30, 230 is detected (confirmed), and an abnormality history is recorded in a storage area (not shown) of the RAM, etc. of the microcomputer 22. However, even when an abnormality in communications between the microcomputer 22 and the communication controller 30, 230 is detected, the abnormality history may not be stored in the RAM of the microcomputer 22. Also, when an abnormality in communications between the microcomputer 22 and the communication controller 30, 230 is detected, a warning light (not shown) may be turned on.

In the first through third embodiments, data communications between the microcomputer 22 and the communication controller 30, 230 are conducted by the packet. However, the data communications may be conducted by the bit stream, for example, rather than by the packet.

In the first embodiment and second embodiment, the microcomputer 22 is an example of the "computer", and the communication controller 30 is an example of the "communication controller", while the shutdown unit 40 is an example of the "shutdown circuitry". In the third embodiment, the microcomputer 22 is an example of the "computer", and the communication controller 230 is an example of the "communication controller", while the shutdown unit 40 is an example of the "shutdown circuitry".

The correspondence relationship between the major elements of the embodiments and the major elements of the disclosure described in the "SUMMARY" section is not intended to limit the elements of the disclosure described in the "SUMMARY" section, since the embodiments are mere examples for specifically describing the modes for carrying out the disclosure described in the "SUMMARY" section. Namely, the disclosure described in the "SUMMARY" section should be interpreted based on the description in this section, and the embodiments are mere specific examples of the disclosure described in the "SUMMARY" section.

While the modes for carrying out the disclosure have been described using the embodiments, the disclosure is by no means limited to these embodiments, but may be embodied in various forms, without departing from the principle of the disclosure.

The present disclosure can be utilized in manufacturing industries of protection control apparatuses for power conversion circuitry.

What is claimed is:

1. A protection control apparatus for power conversion circuitry, the protection control apparatus comprising:
    a computer configured to monitor a plurality of fail signals delivered from the power conversion circuitry to a first number of first signal lines, and create reject information indicating whether each of the fail signals is enabled or rejected;
    a communication controller configured to receive the reject information on each of the fail signals from the computer via a second number of communication lines, and deliver a plurality of reject signals to the first number of second signal lines, based on the reject information, the second number being smaller than the first number; and
    shutdown circuitry provided on a same chip or a same module as the communication controller, the shutdown circuitry being configured to permit driving of the power conversion circuitry or shut down the power conversion circuitry, based on the fail signals received from the first number of the first signal lines, and the reject signals received from the first number of the second signal lines.

2. The protection control apparatus according to claim 1, wherein communications between the computer and the communication controller are conducted for each set of a predetermined number of bits corresponding to the first number.

3. The protection control apparatus according to claim 1, wherein the second number is determined as a constant value, irrespective of the first number.

4. The protection control apparatus according to claim 1, wherein:
    the computer is configured to send a first bit array having bits each including the reject information, to the communication controller, and then send a second bit array to the communication controller; and
    the communication controller is configured to store the reject information of each of the bits included in the first bit array, when receiving the first bit array, and is configured to reflect the stored reject information of each of the bits, in a corresponding one of the reject signals, when receiving the second bit array.

5. The protection control apparatus according to claim 4, wherein:
    upon receipt of the first bit array, the communication controller is configured to send back a reply bit array having bits each including the reject information, to the computer; and
    upon receipt of the reply bit array, the computer is configured to compare the reject information of each of the bits included in the first bit array, with the reject information of each of the bits included in the reply bit array, and send the second bit array to the communication controller when the reject information in the first bit array coincides with the reject information in the reply bit array.

6. The protection control apparatus according to claim 4, wherein:
    upon receipt of the second bit array, the communication controller is configured to reflect the reject information of each of the bits, in the corresponding one of the reject signals, and send back a reflection bit array having bits each including a reflection result on each of the reject signals, to the computer; and
    upon receipt of the reflection bit array, the computer is configured to compare the reject information of each of the bits included in the first bit array, with the reflection result included in the reflection bit array.

7. The protection control apparatus according to claim 4, wherein:
    the computer is configured to send a third bit array having bits each including reject-related information related to the reject information of each of the bits, to the communication controller, after sending the second bit array to the communication controller; and
    upon receipt of the third bit array, the communication controller is configured to compare the reject information of each of the bits included in the first bit array, with the reject-related information of a corresponding one of the bits included in the third bit array, and deliver a comparison result to the computer via a third signal line.

8. The protection control apparatus according to claim 4, wherein:
    the computer is configured to send a third bit array having bits each including reject-related information related to the reject information of each of the bits, to the communication controller, after sending the second bit array to the communication controller; and
    upon receipt of the third bit array, the communication controller is configured to compare the reject information of each of the bits included in the first bit array or the reject-related information of each of the bits included in the third bit array, with a result of reflection of the reject information in the corresponding one of the reject signals, and deliver a comparison result to the computer via a third signal line.

9. The protection control apparatus according to claim 1, wherein:
    the computer is configured to send a bit array having bits each including the reject information, to the communication controller; and
    upon receipt of the bit array, the communication controller is configured to reflect the reject information of each of the bits included in the bit array, in a corresponding one of the reject signals.

10. The protection control apparatus according to claim 9, wherein:
    upon receipt of the bit array, the communication controller is configured to reflect the reject information of each of the bits, in the corresponding one of the reject signals, and send back a reflection bit array having bits each including a reflection result on each of the reject signals, to the computer; and upon receipt of the reflection bit array, the computer is configured to compare the reject information of each of the bits included in the bit array, with the reflection result included in the reflection bit array.

11. The protection control apparatus according to claim 9, wherein the communication controller is configured to deliver information as to whether the reject information of each of the bits is reflected by the corresponding one of the reject signals, to the computer, via a third signal line.

12. The protection control apparatus according to claim 4, wherein the computer is configured to monitor a first command signal to permit driving of the power conversion circuitry, or a second command signal to shut down the power conversion circuitry, the first command signal and the second command signal being transmitted from the shutdown circuitry to the power conversion circuitry.

13. The protection control apparatus according to claim 9, wherein the computer is configured to monitor a first command signal to permit driving of the power conversion circuitry, or a second command signal to shut down the power conversion circuitry, the first command signal and the second command signal being transmitted from the shutdown circuitry to the power conversion circuitry.

14. The protection control apparatus according to claim 4, wherein, upon receipt of a given bit array, the communication controller is configured to determine whether the given bit array has been normally received.

15. The protection control apparatus according to claim 9, wherein, upon receipt of a given bit array, the communication controller is configured to determine whether the given bit array has been normally received.

16. The protection control apparatus according to claim 5, wherein the computer is configured to store a result of detection of an abnormality in communications between the computer and the communication controller when the abnormality is detected.

17. The protection control apparatus according to claim 10, wherein the computer is configured to store a result of detection of an abnormality in communications between the computer and the communication controller when the abnormality is detected.

18. A control method of a protection control apparatus for power conversion circuitry, the protection control apparatus including a computer, a communication controller, and shutdown circuitry provided on a same chip or a same module as the communication controller, the control method comprising:

monitoring, by the computer, a plurality of fail signals delivered from the power conversion circuitry to a first number of first signal lines, and creating reject information indicating whether each of the fail signals is enabled or rejected;

receiving, by the communication controller, the reject information on each of the fail signals from the computer via a second number of communication lines, and delivering a plurality of reject signals to the first number of second signal lines, based on the reject information, the second number being smaller than the first number; and permitting, by the shutdown circuitry, driving of the power conversion circuitry or shut down the power conversion circuitry, based on the fail signals received from the first number of the first signal lines, and the reject signals received from the first number of the second signal lines.

19. The protection control apparatus according to claim 10, wherein the computer is configured to store a result of detection of an abnormality in communications between the computer and the communication controller when the abnormality is detected.

20. The protection control apparatus according to claim 11, wherein the computer is configured to store a result of detection of an abnormality in communications between the computer and the communication controller when the abnormality is detected.

* * * * *